United States Patent
Park et al.

(10) Patent No.: US 11,653,322 B2
(45) Date of Patent: *May 16, 2023

(54) METHOD AND APPARATUS FOR COMMUNICATING REFERENCE SIGNAL FOR BROADCAST CHANNEL

(71) Applicant: Innovative Technology Lab Co., Ltd., Seoul (KR)

(72) Inventors: Dong Hyun Park, Seoul (KR); Sung Jun Yoon, Seoul (KR); Ki Bum Kwon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 17/147,411

(22) Filed: Jan. 12, 2021

(65) Prior Publication Data

US 2021/0136712 A1    May 6, 2021

Related U.S. Application Data

(63) Continuation of application No. 15/971,813, filed on May 4, 2018, now Pat. No. 10,925,023.

(30) Foreign Application Priority Data

May 4, 2017 (KR) .................. 10-2017-0056947
Jul. 28, 2017 (KR) .................. 10-2017-0096391
Nov. 17, 2017 (KR) .................. 10-2017-0153741

(51) Int. Cl.
*H04W 56/00* (2009.01)
*H04W 72/12* (2023.01)
(Continued)

(52) U.S. Cl.
CPC .......... *H04W 56/0015* (2013.01); *H04L 5/00* (2013.01); *H04L 5/0051* (2013.01);
(Continued)

(58) Field of Classification Search
None
See application file for complete search history.

(56) References Cited

U.S. PATENT DOCUMENTS 10,925,023 B2 *  2/2021  Park ..................... H04L 5/00
2018/0241605 A1  8/2018  Luo

FOREIGN PATENT DOCUMENTS

WO    2015046853    4/2015

OTHER PUBLICATIONS

3GPP TSG-RAN WG1 #88, R1 -1701850, Athens, Greece Feb. 13-17, 2017 (Year: 2017).*

(Continued)

*Primary Examiner* — Alex Skripnikov

(57) ABSTRACT

Provided is a method and apparatus for transmitting a reference signal. The method may comprise: determining, based on at least one of a synchronization signal (SS) block index or an index associated with a time interval, an initialization value for a reference signal associated with a physical broadcast channel (PBCH); generating, based on the initialization value, the reference signal associated with a PBCH; mapping, based on one or more of a frequency domain shift value or a time domain shift value, the generated reference signal to resource elements (REs); and transmitting, to a terminal, the mapped reference signal and the PBCH.

20 Claims, 14 Drawing Sheets

(51) Int. Cl.
H04L 27/26 (2006.01)
H04L 5/00 (2006.01)
H04W 84/04 (2009.01)
H04W 72/00 (2023.01)

(52) U.S. Cl.
CPC ...... *H04L 27/2602* (2013.01); *H04L 27/2613* (2013.01); *H04L 27/2692* (2013.01); *H04W 72/12* (2013.01); *H04L 27/26025* (2021.01); *H04L 27/26136* (2021.01); *H04W 72/005* (2013.01); *H04W 84/042* (2013.01)

(56) References Cited

OTHER PUBLICATIONS

3GPP TSG RAN WG1 Meeting #88, R1-1701573, Athens, Greece Feb. 13-17, 2017 (Year: 2017).*
3GPP TSG RAN WG1 Meeting #88, R1-1702522, Athens, Greece, Feb. 13-17, 2017 (Year: 2017).*
Cohere Technologies, "NR SS Burst Composition and SS Time Index Indication", 3GPP TSG-RAN Meeting #88 R1-1702374, Athens, Greece, Feb. 13-17, 2017, pp. 1-5.
3GPP TSG RAN WG1 Meeting #88bis R1-1705170 Spokane, USA, Apr. 3-7, 2017. "Relation among NR-PBCH, SIBs and subcells". Panassonic.
ITL, R1-1705793, "On NR PBCH Design", 3GPP TSG RAN WG1 #88bis, 3GPP. Spokane, USA Apr. 3-7, 2017.
International Search Report (PCT/KR2018/005221).
Written Opinion of The International Search Authority (PCT/KR2018/005221).
Notification of Transmittal of the International Search Report and the Written Opinion of the International Search Authority, or the Declaration (PCT/KR2018/005221).
3GPP TSG RAN WG1 Meeting #88bis R1-1705793 Spokane, USA, Apr. 3-7, 2017. "On NR PBCH Design". ITL.
3GPP TSG RAN WG1 Meeting #88bis R1-1704361 Spokane, USA, Apr. 3-7, 2017. "NR-PBCH Design". ZTE, ZTE Microelectronics.
3GPP TSG-RAN WG1 #88 bis R1-1704599 Spokane, USA, Apr. 3-7, 2017. "Discussion on SS time index indication" Sequans Communications.
3GPP TSG RAN WG1 Meeting #88bis R1-1705500 Spokane, USA, Apr. 3-7, 2017. "On NR-PBCH Transmission" InterDigital Communications.
3GPP TSG RAN WG1 Meeting #88bis R1-1705500 Spokane, USA, Apr. 3-7, 2017. "Relation among NR-PBCH, SIBs and subcells". Panassonic.
NTT Docomo, Inc., "Discussion on NR-PBCH design", 3GPP TSG RAN WG1 Meeting #88 R1-1702827, Athens, Greece, Feb. 13-17, 2017, pp. 1-7.
Ericsson, "Draft 36.211 eMTC CR capturing RAN1#84bis agreements", 3GPP TSG RAN WG1 #84bis, R1-163946, Busan, Korea (Republic of), Apr. 11, 2016-Apr. 15, 2016, pp. 1-154.

* cited by examiner

NR-PBCH

DMRS

METHOD AND APPARATUS FOR COMMUNICATING REFERENCE SIGNAL FOR BROADCAST CHANNEL

CROSS-REFERENCE TO RELATED APPLICATIONS

This application is a continuation of a U.S. patent application Ser. No. 15/971,813, filed on May 4, 2018, which claims priority from and the benefit of Korean Patent Application Nos. 10-2017-0056947, filed on May 4, 2017, 10-2017-0096391, filed on Jul. 28, 2017, and 10-2017-0153741, filed on Nov. 17, 2017, which are hereby incorporated by reference in their entirety.

BACKGROUND

1. Field

The present disclosure relates to a wireless communication system, and more particularly, to a method and apparatus for transmitting and receiving a reference signal for a broadcast channel in a New Radio (NR) system.

2. Discussion of the Background

The International Telecommunication Union (ITU) has been developing International Mobile Telecommunication (IMT) frameworks and standards and is currently under discussion over 5G communication through a program called "IMT for 2020 and beyond".

To meet the requirements of the program "IMT for 2020 and beyond", the 3rd Generation Partnership Project (3GPP) New Radio (NR) system is designed to support a variety of numerologies based on various scenarios, service requirements, and potential system computability. However, there is still a need for defining a method of transmitting and receiving a reference signal for a broadcast channel in an NR system.

SUMMARY

A method and an apparatus for transmitting and receiving a broadcast channel in an NR system will be described.

An example method of transmitting a reference signal is disclosed. The example method may comprise: determining, based on at least one of a synchronization signal (SS) block index or a half-frame timing index, an initialization value for a reference signal associated with a physical broadcast channel (PBCH); generating, based on the initialization value, the reference signal associated with a PBCH; mapping, based on one or more of a frequency domain shift value or a time domain shift value, the generated reference signal to resource elements (REs); and transmitting, to a terminal, the mapped reference signal and the PBCH.

An example apparatus to transmit a reference signal is disclosed. The apparatus may comprise: a processor to determine, based on at least one of a synchronization signal (SS) block index or a half-frame timing index, an initialization value for a reference signal associated with a physical broadcast channel (PBCH), to generate, based on the initialization value, the reference signal associated with a PBCH, and to map, based on one or more of a frequency domain shift value or a time domain shift value, the generated reference signal to one or more resource elements (REs); and a transmitter to transmit, to a terminal, the mapped reference signal and the PBCH.

DETAILED DESCRIPTION OF THE ILLUSTRATED EMBODIMENTS

Figure 1:
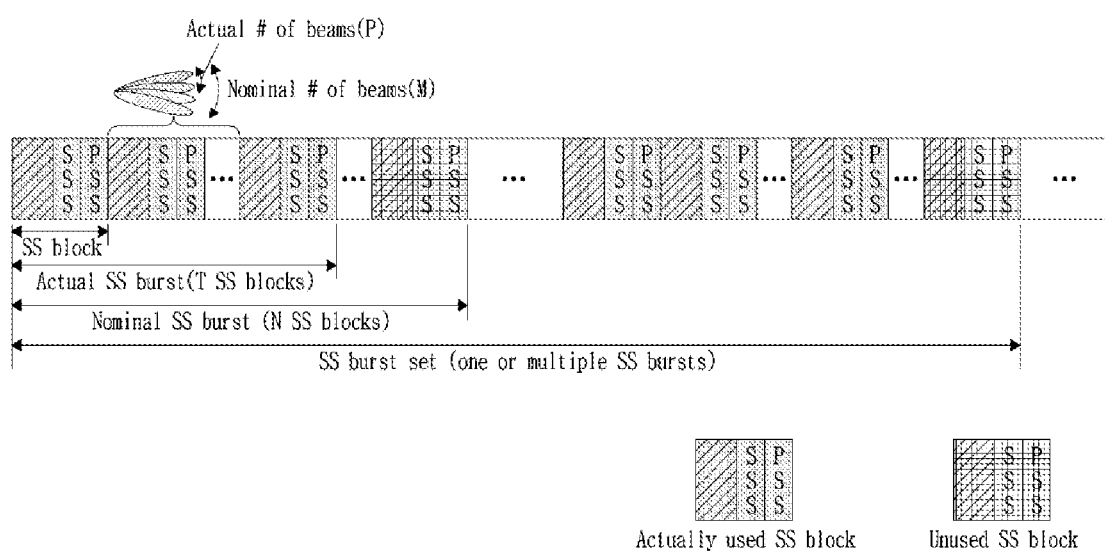
FIG. 1 illustrates configurations of a Synchronization Signal (SS) block, an SS burst, and an SS burst set.

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

Initially, a numerology used in the NR system is described.

An NR numerology may indicate a numerical value of a basic element or factor that generates a resource grid on a time-frequency domain for design of the NR system. As an example of a numerology of a 3rd Generation Partnership Project (3GPP) Long Term Evolution (LTE)/LTE-Advanced (LTE-A) system, a subcarrier spacing corresponds to 15 kilohertz (kHz) (or 7.5 kHz in the case of Multicast-Broadcast Single-Frequency Network (MBSFN)) and a normal Cyclic Prefix (CP) or an extended CP. Here, the meaning of the term 'numerology' does not restrictively indicate only the subcarrier spacing and includes a Cyclic Prefix (CP) length, a Transmit Time Interval (TTI) length, a number of Orthogonal Frequency Division Multiplexing (OFDM) symbols within a desired time interval, a duration of a single OFDM symbol, etc., associated with the subcarrier spacing (or determined based on the subcarrier spacing). That is, one numerology may be distinguished from another numerology based on at least one of the subcarrier spacing, the CP length, the TTI length, the number of OFDM symbols within the desired time interval, and the duration of the single OFDM symbol.

To meet the requirements of the program "International Mobile Telecommunication (IMT) for 2020 and beyond", the 3GPP NR system is currently considering a plurality of numerologies based on various scenarios, various service requirements, compatibility with a potential new system, and the like. In more detail, since current numerologies of wireless communication systems may not readily support, for example, a further higher frequency band, faster movement rate, and lower latency required in the program "IMT for 2020 and beyond", there is a need to define a new numerology.

For example, the NR system may support applications, such as enhanced Mobile Broadband (eMBB), massive Machine Type Communications/Ultra Machine Type Communications (mMTC/uMTC), and Ultra-Reliable and Low Latency Communications (URLLC). In particular, the requirements for user plane latency on the URLLC or eMBB service correspond to 0.5 ms in an upper link and 4 ms in all of the upper link and a down link. A significant latency decrease is required compared to the latency of 10 ms required in the 3GPP LTE and LTE-A system.

Various numerologies need to be supported to meet such various scenarios and various requirements in a single NR system. In particular, a plurality of subcarrier spacings (SCSs) needs to be supported, which differs from the existing LTE/LTE-A systems that supports a single SCS.

To resolve an issue that a wide bandwidth is unavailable in an existing carrier or frequency range of, e.g., 700 megahertz (MHz) or 2 gigahertz (GHz), a new numerology for the NR system, which includes supporting the plurality of SCSs, may be determined with the assumption of a wireless communication system that operates in a carrier or a frequency range of 6 GHz or more or 40 GHz or more. However, the scope of the present disclosure is not limited thereto.

To newly define the NR system, there is, preferentially, a need to define a procedure of obtaining, by a terminal, basic minimum system information of a network and verifying a cell identifier (ID) through an NR-Physical Broadcast Channel (NR-PBCH). However, so far has not been defined in detail a processing method for NR-PBCH transmission, that is, a channel coding chain structure, a resource allocation, and a transmission method regarding minimum system information transmitted through the NR-PBCH.

Hereinafter, various embodiments of the present disclosure regarding transmission and reception of the NR-PBCH in the NR system is described.

Initially, an NR-synchronization signal (NR-SS) composition associated with NR-PBCH transmission is described.

FIG. 1 illustrates configurations of an SS block, an SS burst, and an SS burst set according to the present disclosure.

An NR-SS may include an NR-Primary SS (NR-PSS) and an NR-Secondary SS (NR-SSS) and, if supported, may further include an NR-Ternary SS (TSS). The NR-TSS may be applied to indicate an index of an SS block. FIG. 1 illustrates an NR-PSS/SSS/TSS transmission structure.

In FIG. 1, physical resource locations of NR-PSS/SSS/TSS transmitted per SS block do not indicate actual physical locations and indicate that NR-PSS/SSS and PBCH transmission may be performed within a single SS block. Multiplexing of other signals and channels, such as NR-PSS/SSS and NR-PBCH, allocated to actual physical resources may be applied using a variety of schemes.

Hereinafter, the SS block is described.

The NR-PSS/SSS are included in a single SS block and transmitted. That is, a terminal assumes that NR-PSS/SSS transmission is performed within the SS block. However, whether actual signals of the NR-PSS/SSS/PBCH may be transmitted in the SS block depends on decision of a base station. Depending on an NR-PBCH transmission periodicity and scheme, the NR-PSS/SSS/PBCH transmission may be present at all times within a single SS block or may be absent. Alternatively, in a specific SS block, the NR-PBCH transmission may be skipped and the NR-PSS/SSS transmission may be performed. Alternatively, if the NR-PBCH transmission is performed independently from the NR-SS transmission and the NR-SS and the NR-PBCH are not transmitted together at all times within the SS block, the NR-PBCH may be transmitted within a specific SS block or using fixed SS blocks.

Additionally, other signals may be transmitted in the SS block. For example, a Measurement Reference Signal (MRS) capable of being used by a Radio Resource Control (RRC) IDLE or RRC connected mode terminal for channel quality measurement for beamforming transmission and a TSS indicating a time domain index with an SS block index may be multiplexed and thereby transmitted within a single SS block with the NR-PSS/SSS/PBCH.

In a single SS block, the synchronization signal (NR-SS) and the broadcast channel (NR-PBCH) may be allocated to physical resources through Frequency Division Multiplexing (FDM), Time Division Multiplexing (TDM), or combination of FDM and TDM and may be transmitted from the base station to the terminal.

SS block transmission based on beam transmission or omni-directional beam transmission may be performed by applying a single beam or a plurality of different beams within the SS burst set periodicity. In particular, SS block transmission based on multi-beam transmission is required to compensate for channel attenuation occurring in a high frequency band (e.g., 6 GHz or more). However, in other frequency bands (e.g., less than 6 GHz), transmission may be performed once or iteratively in a single beamform or omni-directional beam transmission form, between all or a portion of the SS blocks. Here, the omni-directional beam transmission may be applied to a single SS block or a plurality of SS blocks to transmit signals and channels of, for example, the NR-SS/PBCH. Alternatively, the multi-beam transmission based on a narrow beam may be applied. Such determination purely depends on the implementation of the base station. Accordingly, an actual number of SS blocks/SS bursts to be used within the SS burst set periodicity may be independently determined and used per base station based on a beam width, frequency range, channel environment, target beam coverage of a transmission reception point (TRP) cell, and the like.

Hereinafter, the SS burst is described.

FIGS. 2 through 5 illustrate examples of physically allocating an SS block in an SS burst composition or slot according to the present disclosure.

A single SS block or a plurality of SS blocks constitutes a single SS burst. If there is no need to define the SS burst within the SS burst set periodicity, the SS burst is simply regarded as allocation of consecutive SS blocks on physical resources.

Referring to FIGS. 2 through 5, SS blocks that constitute a single SS burst may be consecutively or inconsecutively allocated in a time domain or a frequency domain. Also, an SS burst unit may not be required depending on an SS burst set design method. In this case, consecutive or inconsecutive SS blocks are defined within the SS burst set.

Hereinafter, the SS burst set is described.

A single SS burst set may be configured based on a single or a plurality of SS blocks, or a single or a plurality of SS bursts.

From perspective of a terminal, the terminal expects periodical NR-SS reception to which the same beam form is applied per SS burst set periodicity.

The terminal assumes a default SS burst transmission periodicity value per frequency range (e.g., subcarrier spacing) during an initial cell access per specific frequency band.

RRC connected, RRC IDLE, or RRC inactive terminal may receive updated SS burst set transmission periodicity information from the base station. The provided information may be used for subsequent channel measurement (e.g., RRNI measurement).

Hereinafter, an SS burst set composition is described.

Examples of allocating SS blocks to physical resources based on the SS block/SS burst/SS burst set composition may be represented as shown in FIGS. 2 through 5.

Figure 2:
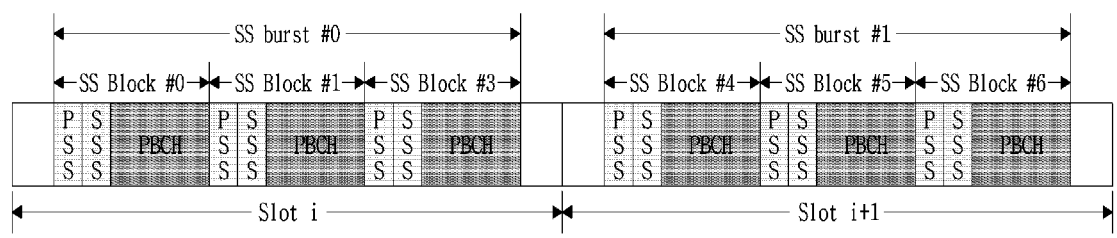
FIGS. 2 through 5 illustrate examples of an SS burst composition.

Referring to FIG. 2, an SS burst includes consecutive SS blocks within a single slot. A gap may be present between SS bursts per slot. In general, the corresponding gap may be used to transmit and receive downlink (DL)/uplink (UL) control information, a blank symbol, and the like. Also, the range of the gap may include one, two, or three OFDM symbols, however, is not limited thereto.

Figure 3:
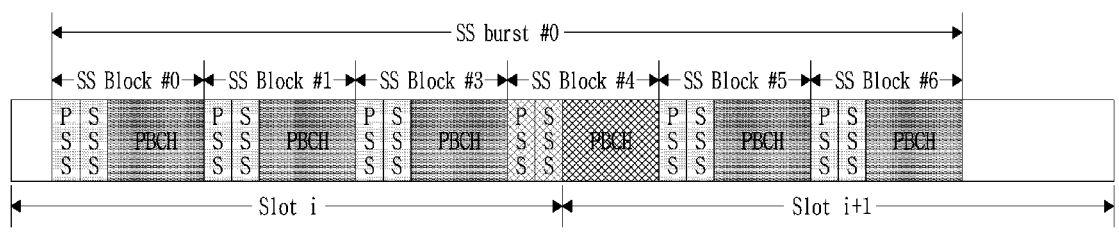

Referring to FIG. 3, an SS burst includes consecutive SS blocks. SS blocks may be allocated between a plurality of slots and thereby transmitted. In the example of FIG. 2, a single SS block may not be allocated over slots. In the example of FIG. 3, a single SS block may be allocated over slots.

Figure 4:
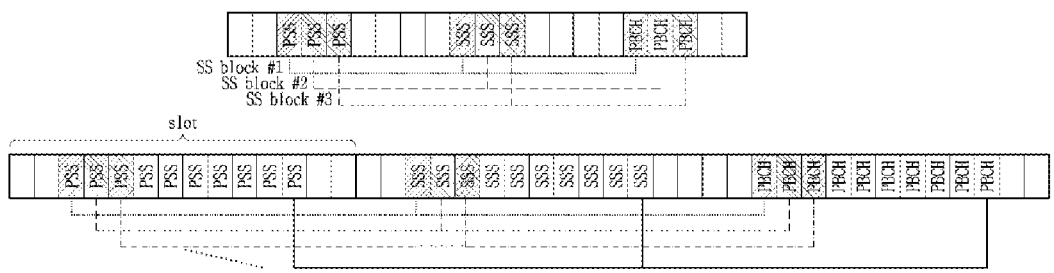

Referring to FIG. 4, each SS block transmission is performed based on a location and a time interval fixed with three inconsecutive OFDM symbols. Within each slot, first two OFDM symbols and last two OFDM symbols may be unused for SS block transmission and may be allocated as a gap, which is similar to the example of FIG. 2.

Figure 5:
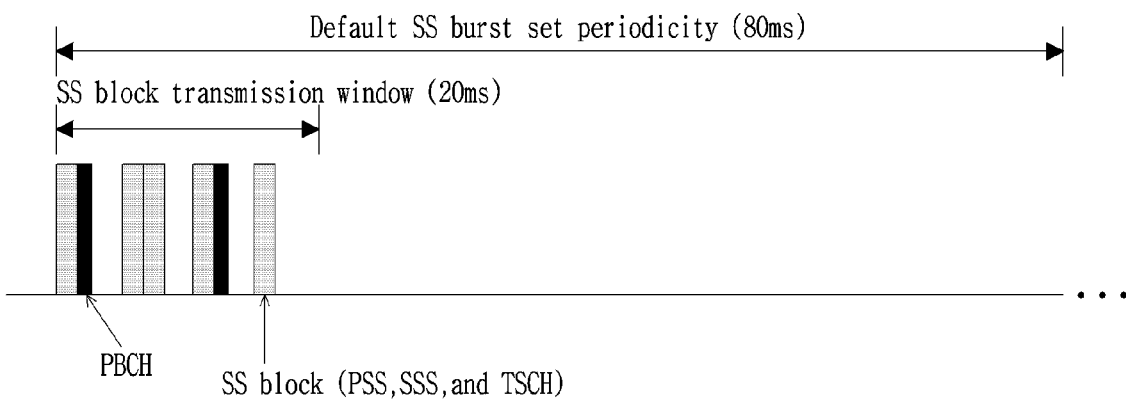

Referring to FIG. 5, a single SS block or a plurality of SS blocks may be transmitted within an SS block transmission window. Similar to the example of FIG. 2, each SS block may be allocated within only a single slot.

Figure 6:
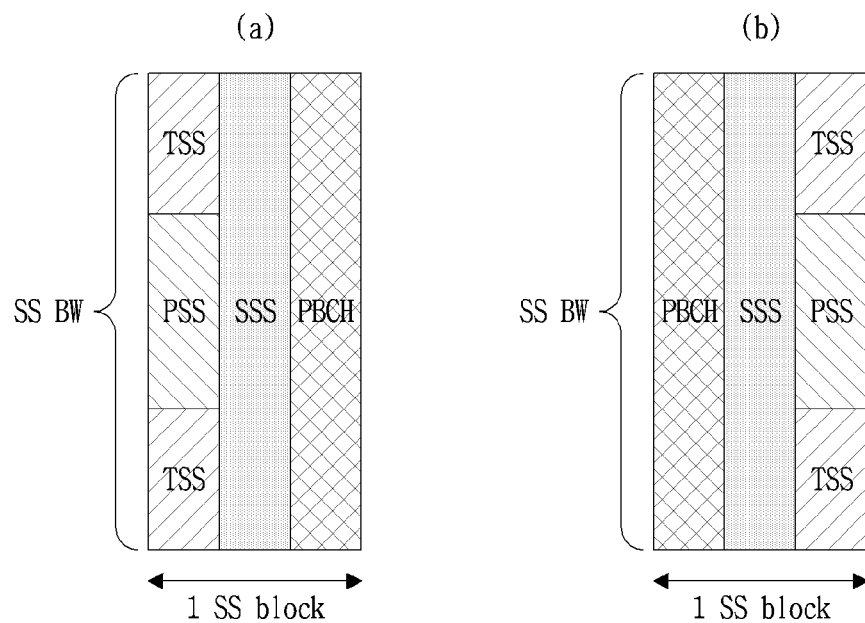
FIG. 6 illustrates examples of resource allocation within an SS block.

FIG. 6, parts (a) and (b), illustrate examples of resource allocation within an SS block according to the present disclosure.

Basically, an NR-PSS/SSS may be used to indicate a cell ID and time/frequency synchronization for initial cell access. Also, an NR-TSS may be used to indicate a time index (e.g., an SS block index) and may be multiplexed and thereby transmitted within a single SS block with the NR-PSS/SSS/PBCH.

For example, (a) of FIG. 6 illustrates an example in which a single SS block includes three OFDM symbols and an SS bandwidth (BW), NR-TSS, NR-PSS, and NR-TSS are mapped to a first OFDM symbol using an FDM scheme, NR-SSS is mapped to a second OFDM symbol, and NR-PBCH is mapped to a third OFDM symbol. (b) of FIG. 6 illustrates an example in which temporal order of signals/channels mapped to OFDM symbols differ from the example shown in (a) of FIG. 6.

Hereinafter, NR-SS default parameters are described.

From perspective of a terminal, there is a need to define a numerology that assumes a specific frequency range (e.g., less than 6 GHz) for the initial access purpose and to define relevant parameters. For example, based on the assumption of the terminal that a default subcarrier spacing is 30 kHz and an NR-SS/PBCH transmission BW is 10 MHz, for the initial access in the frequency range less than 6 GHz, the terminal may receive corresponding signals. Through this, the terminal may minimize latency, complexity, and an amount of power consumption used for the initial access.

For the initial access purpose, the base station and the terminal may define a parameter set associated with the default subcarrier spacing and the NR-SS transmission BW as follows:

Parameter set #W associated with 15 kHz subcarrier spacing and NR-SS transmission BW of 5 MHz or less Parameter set #X associated with 30 kHz subcarrier spacing and NR-SS transmission BW of 10 MHz or less Parameter set #Y associated with 120 kHz subcarrier spacing and NR-SS transmission BW with 40 MHz or less Parameter set #Z associated with 240 kHz subcarrier spacing and NR-SS transmission BW of 80 MHz or less The default subcarrier spacing is independent from a subcarrier spacing for data transmission. Accordingly, a default subcarrier spacing for a signal and a channel, such as the NR-SS/PBCH, for the access and the subcarrier spacing for data transmission (e.g., Physical Downlink Shared Channel (PDSCH)) may differ from each other.

The terminal may assume a different default SS burst set periodicity value per frequency band range. Alternatively, the default SS burst set periodicity value may have a fixed value (e.g., 20 ms) at all times regardless of the frequency band range. Accordingly, the parameter set may include a variety of information, for example, the default subcarrier spacing, the frequency band range, the SS burst set periodicity, and the number of SS blocks within the SS burst set periodicity.

Also, a maximum number of SS blocks within the SS burst set may be defined as L. A different L value may be assigned per frequency band range. Since L denotes the maximum number of SS blocks allowed to be present in a system, an actual number of SS blocks to be transmitted (used) from the base station may be less than or equal to L. From perspective of the terminal performing the initial access, the number of SS blocks to be used for the actual transmission and locations in terms of time/frequency may be unknown. Accordingly, the terminal performs blind decoding at all of the possible locations, verifies whether to perform NR-SS and NR-PBCH transmission, and performs decoding. In the meantime, in an RRC CONNECTED/IDLE mode, the terminal may receive information about a location of an SS block that is actually transmitted from the base station for the purpose of channel measurement. The terminal may measure a further reliable channel measurement value based on the received information and may report to the base station about the measured channel measurement value.

A maximum value of L denoting the maximum number of SS blocks within the SS burst set may be set to be different based on the frequency range. For example, a value of L may be 1, 2, or 4 in the frequency range of maximum up to 3 GHz, may be 4 or 8 in the frequency range from 3 GHz to 6 GHz, and may be 64 in the frequency range from 6 GHz to 52.6 GHz.

A single set of possible SS block time locations per frequency band may be defined. In detail, possible SS block time locations within the SS burst set periodicity are defined as a single set per frequency band and a possible SS block location is defined based on L that is the maximum number of SS blocks. As described above, an actual number of SS blocks and time locations thereof to be used for actual NR-SS and NR-PBCH transmission within the defined set of SS block time locations per frequency range may be selected by the base station.

Hereinafter, the NR-PBCH is described.

Information (i.e., contents) included in the NR-PBCH may also be referred to as an NR-Master Information Block (MIB). Partial information to be known by the terminal for initial access of the NR system in minimum system information (minimum SI) is configured as an MIB. The corresponding MIB is subsequently broadcasted to terminals through the NR-PBCH. Currently, the NR system considers multi-beam transmission and a plurality of numerologies. Thus, an MIB size greater than that defined in an LTE system is expected Information currently includable in the MIB for the NR system follows as:

At least a portion of a system frame number (SFN): A portion of the system frame number may be provided in the MIB and a remaining thereof may be obtained by the terminal through NR-PBCH blind detection. Alternatively, the whole system frame number may be provided through the MIB. For example, the NR system may explicitly indicate the system frame number or a hyper system frame number using 7, 10, or 17 bits within the MIB and remaining 3-bit information may be implicitly provided through a PBCH transmission method. In this manner, the terminal may obtain a final NR system frame number.

Cyclic Redundancy Check (CRC): A size of the CRC within an information field of the MIB may be defined as 16 bits or 24 bits. In the case of using the CRC of 24 bits, it is possible to further reduce a probability that the CRC triggers a false alarm. Accordingly, the NR-PBCH may be further reliably detected.

Physical Downlink Shared Channel (PDSCH) configuration information to receive Remaining Minimum System Information (RMSI): For example, the PDSCH configuration information refers to information about a Physical Downlink Control Channel (PDCCH) control search region (PDCCH configuration information) for scheduling a PDSCH used to transfer the RMSI. Here, information about the PDCCH control search region included in the MIB corresponds to PDCCH configuration information for corresponding PDCCH reception if the PDSCH used to transmit the RMSI is scheduled through the PDCCH.

SS block index: If SS block index information is not provided through another signal (e.g., NR-SSS, NR-TSS), the SS block index may be explicitly provided through the NR-PBCH.

Value tag: The value tag is information used to notify a change in contents of RMSI in advance through the MIB. Accordingly, it is possible to avoid unnecessary time latency and operation when the terminal obtains new system information (SI).

Scrambling of a DeModulation Reference Signal (DMRS) and data for a PDSCH: In the case of transmitting RMSI through a PDSCH based on a single frequency network scheme, a single frequency network operation may be supported by performing scrambling using a specific ID (e.g., a group cell ID) and scrambling information used herein may be provided through the MIB.

Configuration information for initial uplink transmission: This configuration information corresponds to configuration information for random access channel transmission.

Other additional information.

A bit size of the entire NR-MIB information that includes information disclosed in the aforementioned examples may have a value between about 40 bits and 100 bits.

Hereinafter, the NR-PBCH transmission BW is described.

Similar to the default parameter set for the NR-SS, a parameter set associated with the NR-PBCH transmission may be determined based on a default SCS and NR-PBCH maximum transmission BW. For the initial access purpose, the base station and the terminal may define a parameter set associated with the default subcarrier spacing and the NR-PBCH transmission BW as follows. The NR-PBCH transmission BW may be determined based on a default subcarrier spacing value and an NR-PBCH transmission BW (i.e., 288 Resource Element (RE)) assumed per frequency range.

Parameter set #W associated with 15 kHz subcarrier spacing and NR-PBCH transmission BW (e.g., 15 kHz*288) of 5 MHz or less Parameter set #X associated with 30 kHz subcarrier spacing and NR-PBCH transmission BW (e.g., 30 kHz*288) of 10 MHz or less Parameter set #Y associated with 120 kHz subcarrier spacing and NR-PBCH transmission BW (e.g., 120 kHz*288) of 40 MHz or less Parameter set #Z associated with 240 kHz subcarrier spacing and NR-PBCH transmission BW (e.g., 240 kHz*288) of 80 MHz or less In the NR-PBCH numerology, the terminal assumes that the NR-SS and the NR-PBCH have the same numerology for the initial access purpose. For another purpose (e.g., channel measurement), a numerology (e.g., SCS) value for the NR-SS and the NR-PBCH may be set to be different from a default subcarrier spacing value based on a configuration of the base station.

In terms of multiplexing of the NR-SS (NR-PSS/NR-SSS)/NR-PBCH within an SS block, the NR-PSS and the NR-SSS are multiplexed using a TDM scheme in all of a single beam scenario and a multi-beam scenario. Also, in all of the single beam scenario and the multi-beam scenario, the NR-SS and the NR-PBCH are multiplexed using the TDM scheme. That is, within a single SS block, all of the NR-PSS, the NR-SSS, and the NR-PBCH are multiplexed using the TDM scheme and thereby allocated to different OFDM symbols, respectively, and thereby transmitted.

A single antenna port-based transmission scheme or a Space Frequency Block Coding (SFBC) transmission scheme may be applicable as the NR-PBCH transmission scheme. A number of antenna ports to be defined for PBCH transmission may be determined based on each transmission scheme. In the NR system, the terminal may perform PBCH demodulation based on a fixed number of antenna ports at all times. Thus, a reception complexity of the terminal may decrease.

In terms of a reference signal for demodulation of the NR-PBCH, the NR-SSS or the DMRS may be considered. The NR-SSS is located in an OFDM symbol next to the NR-PBCH within the same SS block and used for demodulation with assuming the same antenna port as that of the PBCH. In this case, reference signal overhead may not increase since an additional reference signal for the NR-PBCH is not required. In the case of using the DMRS for the NR-PBCH demodulation, the DMRS may apply further flexible resource mapping on an OFDM symbol on which the NR-PBCH is transmitted. Thus, further enhanced link performance may be provided.

Hereinafter, a reference signal configuration and transmission/reception method for the NR-PBCH according to embodiments of the present disclosure are described. In detail, the DMRS used for demodulation of the NR-PBCH is described.

A reception end of the NR-PBCH may estimate a channel using the DMRS transmitted with the NR-PBCH and may perform demodulation of the NR-PBCH based on the estimated channel. Herein, a method of generating a DMRS sequence for the NR-PBCH and mapping physical resources is described.

Herein, it is assumed that the DMRS is designed based on a Quadrature Phase Shift Keying (QPSK) based gold-sequence.

A structure of a frequency domain and a time domain in which the NR-PBCH is transmitted may include at least 24 PRBs (i.e., 288 REs) and two OFDM symbols within an SS block. Here, it is assumed that a single PRB includes 12 REs per OFDM symbol in the frequency domain. If a number of DMRS REs per single PRB and OFDM symbol is one of 2, 4, and 6, an actual number of REs allocated for the DMRS per OFDM symbol in the frequency domain may be one of 48(=2*24), 96(=4*24), and 144(=6*24) among 288 REs. However, it is provided as an example only. Thus, without being limited thereto, the number of DMRS REs may be 3 or 5 based on requirements of PBCH demodulation performance and RS overhead. Herein, for clarity of description, a description is made based on the assumption that 2 or 4 DMRS REs are generally allocated per PRB and per OFDM symbol.

Figure 15:
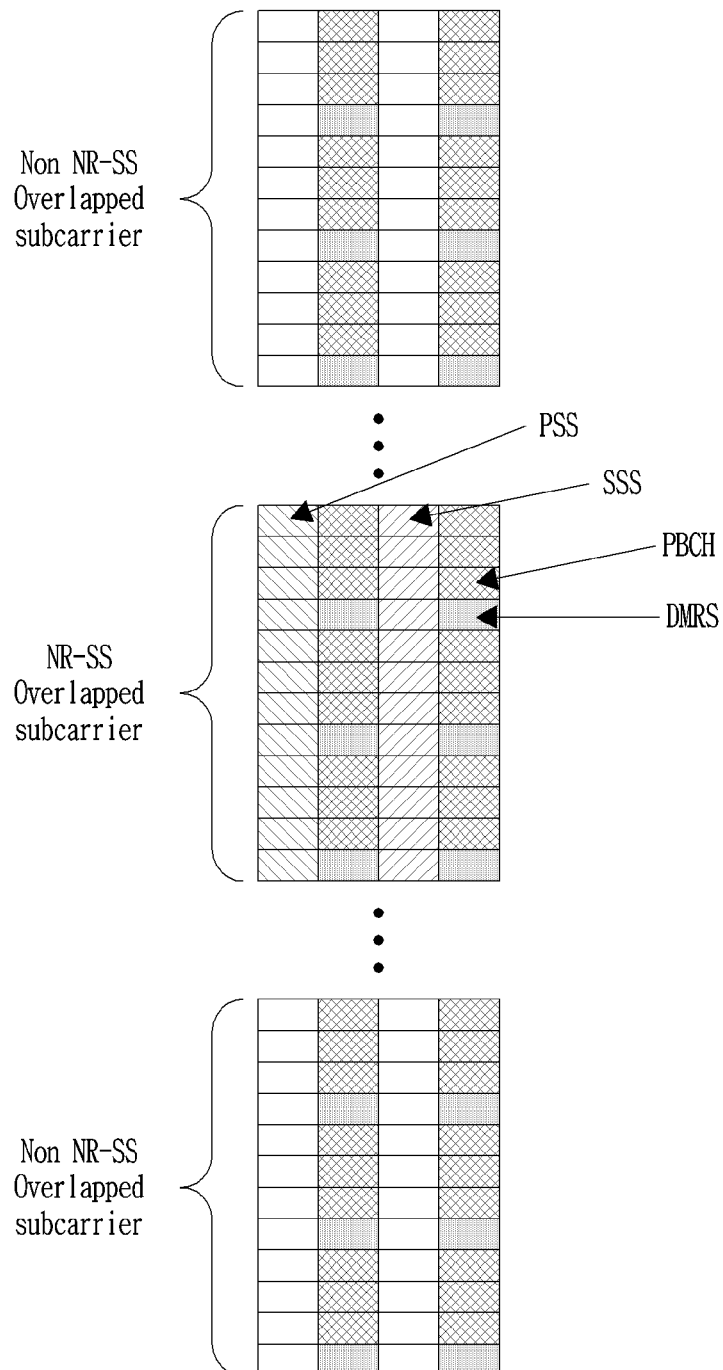
FIGS. 15 and 16 illustrate examples of allocating a PBCH reference signal sequence.

A structure of a frequency domain and a time domain in which another NR-PBCH is transmitted may be configured so that DMRS REs may be allocated to at least 20 PRBs (i.e., 240 REs) and 3 OFDM symbols within an SS block. Referring to FIG. 15, in a first OFDM symbol within an SS block, a PSS may be allocated on 127 REs (i.e., subcarrier) of a center frequency to which the SS block is allocated. In a second OFDM symbol, a PBCH may be allocated on 240 REs. In a third OFDM symbol, PBCHs may be allocated to both sides based on an SSS. In a last OFDM symbol, a PBCH may be allocated. Here, a bandwidth of the SS block to which the PBCH is allocated corresponds to 20 PRBs. A PSS transmission bandwidth of the first OFDM symbol corresponds to about 12 PRBs. A PSS sequence is allocated on the 127 REs and transmitted. Similarly, SSS transmission is performed on the 127 REs by allocating the same bandwidth as that of the PSS trabsnussuib. Remaining REs excluding REs associated with the PSS transmission within the SS block bandwidth (20 PRBs) on the OFDM symbol on which the PSS is transmitted are unused for the SS block transmission. Accordingly, if frequency axis locations of the PSS/SSS/PBCH are indicated with a subcarrier index of the SS block bandwidth, allocations are performed to the PSS (first OFDM symbol and subcarrier indices 56 to 182), the SSS (third OFDM symbol and subcarrier indices 56 to 182), the PBCH (second/fourth OFDM symbols and subcarrier indices 0 to 239), and PBCH (third OFDM symbol and subcarrier indices 0 to 47, 192 to 239). As a result, the PBCH may be transmitted using rear three OFDM symbols within a single SS block that includes four OFDM symbols. As described above, in each of the PRBs on the three OFDM symbols each on which the PBCH is transmitted, the DMRS has the same three RS overheads among 12 REs and is allocated on each of the three OFDM symbols at uniform intervals of four REs and thereby transmitted.

Figure 7:
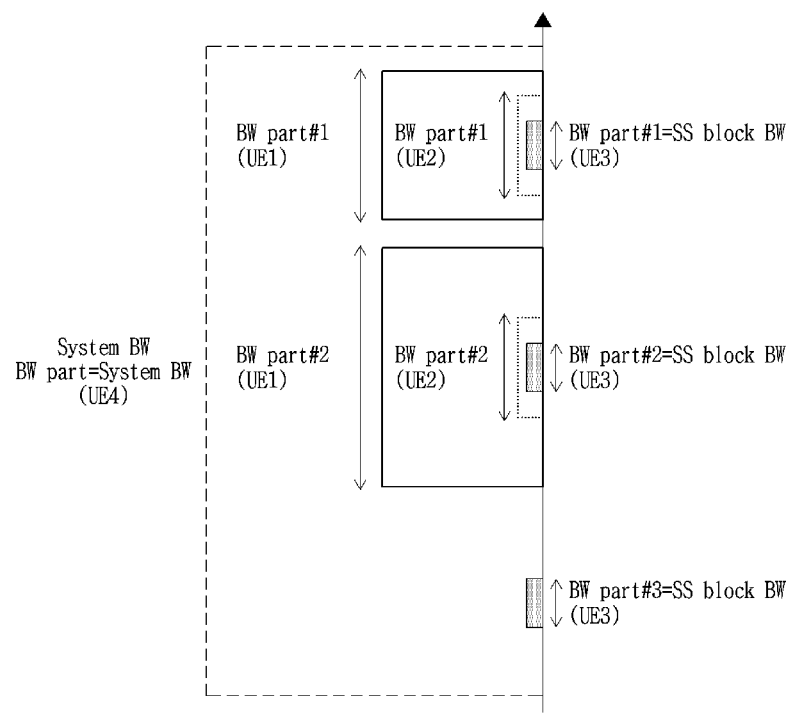
FIG. 7 illustrates an example of a bandwidth of a New Radio (NR) system.

FIG. 7 illustrates an example of a bandwidth of an NR system according to the present disclosure.

To generate a DMRS sequence for an NR-PBCH, there is a need to consider a maximum system bandwidth (Max BW) value. The maximum system bandwidth may be represented as $N^{max,DMRS}_{RB}$. The maximum system bandwidth is a bandwidth that is assumed to generate the DMRS sequence and thus, may differ from a system bandwidth for a single component carrier.

In the NR system, a single bandwidth part (BW part) or a plurality of BW parts may be present within a system bandwidth of a single component carrier (CC). Each BW part may be configured as a single group that includes consecutive PRBs. Although each BW part may include potential SS block transmission based on a configuration of a base station, a BW part that does not include the SS block transmission may be present. Accordingly, potentially at least one NR-PBCH may be transmitted from the base station through at least one BW part within a single system bandwidth of a single CC as shown in FIG. 7.

Configurations of a single BW part may include the following elements:

Center frequency: describes, for example, a center location of a BW part in a frequency domain.

Numerology: describes, for example, a subcarrier spacing, a CP length, a frequency range, etc.

Bandwidth: describes a number of PRBs (24, 48, 96, . . . ).

Presence/absence of SS block (i.e., NR-PSS/SSS/PBCH): presence/absence.

As described above, a single BW part includes consecutive PRBs within the system bandwidth of a single CC.

A BW value available for a single BW part may be predetermined as described above. The BW value of a single BW part may be determined based on sets of values that are at least greater than 20 or 24 PRBs (i.e., 204 or 288 REs) and less than the system bandwidth. Here, a largest BW value may be defined as a maximum BW (i.e., $N^{max,DMRS}_{RB}$) settable within a single BW part. $N^{max,DMRS}_{RB}$ may be defined for the DMRS sequence generation. In addition, the BW settable within a single BW part may be set to be less than or equal to a maximum bandwidth capability (UE Max BW capability) of a corresponding terminal. Accordingly, a bandwidth configuration for a different BW part per UE may be instructed by the base station based on the maximum bandwidth capability of each terminal.

Also, "a maximum number of BW parts" possible to be present within a single system bandwidth may be predetermined.

A number of BW parts set for the terminal may be determined based on the available number for the BW part configurations. Information about the number of BW parts set for the terminal may be provided and set from the base station to the terminal through upper layer signaling (e.g., RRC signaling). For example, the available number for the BW part configurations may be set as 1, 2, 4, 8, . . . .

The respective BW part configurations may be independently determined. The respective BW part configurations may be determined within the range of available values. The respective BW part configurations may be provided from the base station to the terminal through upper layer signaling. One or more BW part configurations may be provided to the terminal based on a number of independent BW part configurations that are provided to the terminal. As described above, the maximum number of BW part configurations may be predetermined.

In the aforementioned example, upper layer signaling for the BW part configurations may be UE dedicated RRC signaling.

The respective BW parts may be set to have different bandwidths. A bandwidth of each BW part may be set based on the UE capability.

For example, referring to FIG. 7, two BW parts #1 and #2 may be set for UE1 and the BW parts #1 and #2 for UE1 may be set to have different bandwidths. Each of the BW parts #1 and #2 includes an SS block.

Two BW parts #1 and #2 may be set for UE2 and the BW parts #1 and #2 for UE2 may be set to have the same bandwidth.

Three BW parts #1, #2, and #3 may be set for UE3 and the BW parts #1, #2, and #3 for UE3 may be set to have the same bandwidth. In particular, FIG. 7 illustrates an example in which the bandwidth of each BW part for UE3 is 24 PRBs, which is the same as a bandwidth of the SS block.

A single BW part may be set for UE4 and may be set to have the same bandwidth as a UE operational bandwidth (i.e., a system bandwidth).

That is, if an SS block may be present within a BW part, a bandwidth of the BW part may be greater than or equal to the SS block bandwidth. Otherwise, the bandwidth of the BW part may be less than the SS block bandwidth. Accordingly, a bandwidth of a BW part set for each terminal (UE) may be determined based on the maximum bandwidth capability of a corresponding terminal and the SS block bandwidth.

Referring to the example of FIG. 7, within a system bandwidth (BW) of a single CC, a BW part may be independently set per UE based on the UE max BW capability. Accordingly, a BW for NR-PBCH DMRS sequence generation needs to consider an environment in which each UE operates in a different bandwidth. In addition, although the aforementioned bandwidth configuration is described based on an RRC connected UE, there is a need to support that RRC disconnected (e.g., RRC idle or RRC inactive) UEs receive the NR-PBCH DMRS. Accordingly, a DMRS sequence generation method based on the aforementioned various bandwidth allocations is described herein.

The following Equation 1 represents the DMRS sequence generation. Equation 1 corresponds to an example of generating a DMRS using a QPSK based gold sequence.

$$r_{SS}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, n \cdot N^{max,DMRS}_{RB} - 1$$

In Equation 1, the DMRS sequence may be generated with a length of $n*N^{max,DMRS}_{RB}$, and a portion or all of the generated sequence may be mapped to an NR-PBCH DMRS RE.

In Equation 1, a value of n may be determined using one of the following examples:

number of DMRS REs per PRB (i.e., indicates that a sequence is generated per OFDM symbol).

number of DMRS REs per PRB*2 OFDM symbols (i.e., indicates that a sequence is generate per SS block).

number of DMRS REs per PRB*2 OFDM symbols*number of SS blocks per slot(s) (i.e., indicates that a sequence is generated per slot(s)).

number of DMRS REs per PRB*2 OFDM symbols*number (L) of SS blocks per SS burst set unit (i.e., indicates that a sequence is generated per SS burst set unit).

number of DMRS REs per PRB*2 OFDM symbols*number of SS blocks per slot(s)*number of slots per 80 ms (i.e., indicates that a sequence is generated per 80 ms).

Also, the maximum BW or the number or PRBs (i.e., $N^{max,DMRS}_{RB}$) to be assumed for the NR-PBCH DMRS sequence generation in a frequency domain in a single OFDM symbol may be determined according to one of the following Equation 2, Equation 3, and Equation 4.

$$N_{RB}^{max,DMRS} = K_{max,BWpart} \times N_{RB}^{max,SSblock} \quad \text{[Equation 2]}$$

In Equation 2, $K_{max,BWpart}$ denotes the maximum number of BW parts possible to be present within the system bandwidth of a single CC in terms of an NR base station and $N^{max,SSblock}_{RB}$ denotes the maximum bandwidth (e.g., 24 PRBs) of the SS block.

A value of $K_{max,BWpart}$ that is the maximum number of BW parts in terms of the NR base station may differ from a maximum number of BW part configurations in terms of a terminal (UE). That is, $K_{max,BWpart}$ that is maximally available in the system bandwidth of a single CC in terms of the NR base station may be greater than or equal to the maximum number of BW parts settable or set for the UE. $K_{max,BWpart}$ may be predetermined using a value known between the base station and the UE.

$$N_{RB}^{max,DMRS} = K_{max,BWpart} \times N_{PRB}^{max,BWpart} \quad \text{[Equation 3]}$$

In Equation 3, $N^{max,BWpart}_{PRB}$ denotes the maximum BW, that is, the maximum number of PRBs available within a single BW part configuration.

Similar to Equation 2, the maximum BW for the DMRS sequence generation may be determined based on the maximum number ($K_{max,BWpart}$) of BW parts possible to be present within the system bandwidth of a single CC in terms of the NR base station and the maximum BW ($N^{maxBWPart}_{PRB}$) of a single BW part.

$$N_{RB}^{max,DMRS} = N_{RB}^{max,SSblock} \quad \text{[Equation 4]}$$

In Equation 4, the number of PRBs for sequence generation may be determined to be the same as 20 or 24 PRBs to which the NR-PBCH is allocated. A PRB that constitutes a BW part within the system bandwidth may be used to determine the maximum system bandwidth (Max. BW) for the DMRS sequence generation based on the SS block BW at all times.

The proposed definition for the maximum bandwidth on the frequency domain for the NR-PBCH DMRS sequence generation relates to predetermining a maximum bandwidth value for the DMRS sequence generation based on a bandwidth part (BP) (e.g., a BP maximum bandwidth, a maximum number of BPs, etc.) possible to be present within a single system bandwidth, and a PBCH (SS block) possible to be present within each BP and to enabling the predetermined maximum bandwidth value to be used for PBCH decoding before the terminal connects to a system.

Hereinafter, an initialization time and generation method of a pseudo-random (PN) sequence c(i) that is used for DMRS sequence generation for the NR-PBCH is described.

In the following embodiments, it is assumed that a terminal determines a time index based on a signal a signal received through an SS block in association with the initialization time of the PN sequence for the DMRS sequence generation. For example, it is assumed that the terminal may obtain SS block index information through blind search using an NR-TSS and may obtain an OFDM symbol index, a slot index, and radio frame boundary information based on the obtained SS block index information.

Also, it is assumed that the terminal may detect an SS block index or a half-frame timing (e.g., 5 ms time window timing within a single 10 ms radio frame) through blind decoding of the DMRS sequence based on the proposed method.

Here, the half-frame timing indicates whether a 5 ms time window within a radio frame corresponding to a time of 10 ms corresponds to front 5 ms or rear 5 ms based on 1-bit information. The half-frame timing information may be transferred through the PBCH DMRS and may instruct terminals using a DMRS sequence initial value with SS block index information (2 bits, L=4) in the frequency band range (frequency range of 3 GHz or less) with L=4 that is a maximum number for the SS block. The aforementioned time information indicates that the SS block and half-frame timing information may be obtained and used using the DMRS alone without using the PBCH decoding for channel measurement of potential target cells mainly in the case of performing handover. In particular, at a time of handover, such operation enables a terminal side to not perform PBCH decoding in performing channel measurement with respect to a plurality of cells, thereby minimizing the complexity and power consumption of the terminal.

Also, in the following embodiments, a method of generating a scrambling sequence of a different unit based on a DMRS TTI unit (i.e., DMRS estimation unit) is considered.

Embodiment 1

The present embodiment relates to a method of initializing and generating a scrambling sequence per 80 ms.

Embodiment 1-1

According to the present embodiment, at least one of a radio frame index, a slot index, and an OFDM symbol may be used as an input value for the DMRS sequence initialization.

The radio frame index may have a value corresponding to one of 0 to 7 within the unit of 80 ms.

The slot index may indicate a slot index per radio frame. For example, if a subcarrier spacing (SCS) of 240 kHz is assumed, the slot index may have a value corresponding to one of 0 to 319. In all of the following embodiments, it is assumed that a slot index range per radio frame varies based on a subcarrier spacing value because a slot index value defined per radio frame varies based on the subcarrier spacing. In the above example, although the slot index value may be determined within the range of 0 to 319 based on the assumption of the subcarrier spacing of 240 kHz, the slot index value may be determined using one of 0 to 19 with the assumption of the subcarrier spacing of 15 kHz.

The OFDM symbol index may indicate an OFDM symbol per slot. For example, the OFDM symbol index may have a value corresponding to one of 0 to 13.

Embodiment 1-2

According to the present embodiment, at least one of an SS burst set index, an SS block index, and an OFDM symbol index may be used as an input value for the DMRS sequence initialization.

The SS burst set index may have a value corresponding to one of 0 to 3 within the unit of 80 ms.

The SS block index may indicate an SS block index per SS burst set. The SS block index may have a different value based on the frequency range and may have a value corresponding to one of 0 to L−1. Here, as described above, L denotes the maximum number of SS blocks within the SS burst set.

The OFDM symbol index may indicate an OFDM symbol index per SS block. For example, the OFDM symbol index may have a value of either 0 or 1. Alternatively, the OFDM symbol index may have a value corresponding to one of 0 to 3, or may have a value corresponding to one of 0 to 13.

Embodiment 2

The present embodiment relates to a method of initializing and generating a scrambling sequence per slot(s). If the scrambling sequence initialization and generation process for the DMRS sequence generation is performed per a plurality of slots, the initialization and generation process for the DMRS sequence generation is performed based on a time unit (20 ms) corresponding to the plurality of slots.

Embodiment 2-1

According to the present embodiment, at least one of a slot(s) index and an OFDM symbol index may be used as an input value for the DMRS sequence initialization.

The slot(s) index may indicate a slot index per radio frame. For example, if a subcarrier spacing (SCS) of 240 kHz is assumed, the slot(s) index may have a value corresponding to one of 0 to 319. As described above, it is assumed that the slot index range per radio frame varies based on a subcarrier spacing value.

The OFDM symbol index may indicate an OFDM symbol index per slot. For example, the OFDM symbol index may have a value corresponding to one of 0 to 13.

Embodiment 2-2

According to the present embodiment, at least one of a slot(s) index, an SS block index, and an OFDM symbol index may be used as an input for the DMRS sequence initialization.

The slot(s) index may indicate a slot index per radio frame. For example, if a subcarrier spacing (SCS) of 240 kHz is assumed, the slot(s) index may have a value corresponding to one of 0 to 319.

The SS block index may indicate an SS block index per slot(s).

The OFDM symbol index may indicate an OFDM symbol index per SS block. For example, the OFDM symbol index may have a value of either 0 or 1. Alternatively, the OFDM symbol index may have a value corresponding to one of 0 to 3, or may have a value corresponding to one of 0 to 13.

Embodiment 3

The present embodiment relates to a method of initializing and generating a scrambling sequence per a plurality of SS blocks. That is, a PBCH DMRS sequence generation process is performed per single SS block or a plurality of SS blocks. In addition to the aforementioned cell ID, SS block index and half-frame timing index information may be used as initial values for each DMRS sequence generation. If the scrambling sequence initialization and generation process for DMRS sequence generation is performed per the plurality of SS blocks, the plurality of SS blocks may be regarded as an SS burst. The initialization and generation process for the DMRS sequence generation is performed based on a time unit (20 ms) corresponding to the plurality of SS blocks.

Embodiment 3-1

According to the present embodiment, at least one of a slot(s) index, an SS block index, and an OFDM symbol index may be used as an input value for the DMRS sequence initialization.

The slot(s) index may indicate a slot index per radio frame. For example, if a subcarrier spacing (SCS) of 240 kHz is assumed, the slot(s) index may have a value corresponding to one of 0 to 319. As described above, it is assumed that the slot index range per radio frame varies based on a subcarrier spacing value.

The SS block index may indicate an SS block index per slot(s).

The OFDM symbol index may indicate an OFDM symbol index per SS block. For example, the OFDM symbol index may have a value of either 0 or 1. Alternatively, the OFDM symbol index may have a value corresponding to one of 0 to 3, or may have a value corresponding to one of 0 to 13.

Embodiment 3-2

According to the present embodiment, at least one of an SS block index, an OFDM symbol index, and half-frame timing information may be additionally used as an input value for the DMRS sequence initialization in addition to a cell ID.

The SS block index may indicate an SS block index per radio frame. For example, if a subcarrier spacing (SCS) of 240 kHz is assumed, the SS block index may have a value corresponding to one of 0 to 319. As described above, it is assumed that the slot index range per radio frame varies based on a subcarrier spacing value.

Alternatively, the SS block index may indicate an SS block index per SS burst set. The SS block index may have a different value based on the frequency range and may have a value corresponding to one of 0 to L−1. Here, as described above, L denotes the maximum number of SS blocks within the SS burst set.

The OFDM symbol index may indicate an OFDM symbol index per S S block. For example, the OFDM symbol index may have a value of either 0 or 1. Alternatively, the OFDM symbol index may have a value corresponding to one of 0 to 3, or may have a value corresponding to one of 0 to 13.

Embodiment 4

The present embodiment relates to a method of initializing and generating a scrambling sequence per a single SS burst set or a plurality of SS burst sets. If a scrambling sequence initialization and generation process for DMRS sequence generation is performed per the plurality of SS burst sets, the initialization and generation process for DMRS sequence generation is performed based on a time unit (20 ms) corresponding to the plurality of SS burst sets.

Embodiment 4-1

According to the present embodiment, at least one of a radio frame index, a slot(s) index, an SS block index, and an OFDM symbol index may be used as an input value for the DMRS sequence initialization.

The radio frame index may have a value corresponding to a radio frequency index 0 or 1 present within a time corresponding to a 20 ms SS burst set periodicity.

The slot(s) index may indicate a slot index per radio frame. For example, if a subcarrier spacing (SCS) of 240 kHz is assumed, the slot(s) index may have a value corresponding to one of 0 to 319. As described above, it is assumed that the slot index range per radio frame varies based on a subcarrier spacing value.

The SS block index may indicate an SS block index per slot(s).

The OFDM symbol index may indicate an OFDM symbol index per SS block. For example, the OFDM symbol index may have a value of either 0 or 1. Alternatively, the OFDM symbol index may have a value corresponding to one of 0 to 3, or may have a value corresponding to one of 0 to 13.

Embodiment 4-2

According to the present embodiment, at least one of an SS block index and an OFDM symbol index may be used as an input value for the DMRS sequence initialization.

The SS block index may indicate an SS block index per radio frame. For example, if a subcarrier spacing (SCS) of 240 kHz is assumed, the SS block index may have a value corresponding to one of 0 to 319. As described above, it is assumed that the slot index range per radio frame varies based on a subcarrier spacing value.

Alternatively, the SS block index may indicate an SS block index per SS burst set. The SS block index may have a different value based on the frequency range and may have a value corresponding to one of 0 to L−1. Here, as described above, L denotes the maximum number of SS blocks within the SS burst set.

The OFDM symbol index may indicate an OFDM symbol index per SS block. For example, the OFDM symbol index may have a value of either 0 or 1. Alternatively, the OFDM symbol index may have a value corresponding to one of 0 to 3, or may have a value corresponding to one of 0 to 13.

As described above, at least one of ID information, CP length information, and SS block frequency location index information (i.e., bandwidth part (BP) index information: BP index possible to be present within a single component carrier (CC)) may be further used as an input value for the DMRS sequence initialization. The ID information may include a cell ID, a UE ID, a virtual Id, and the like. The CP length may indicate a normal CP or an extended CP. If a value of CP length information is 0, it may correspond to the normal CP. If the value is 1, it may correspond to the extended CP. The SS block frequency location index information may correspond to a BP index value or an index about a frequency location of an SS block within the system bandwidth of a single CC.

Although the aforementioned embodiments assume that a terminal obtains a time domain index (e.g., an SS block index) based on a signal included in an SS block, the terminal may receive the NR-PBCH DMRS in a state in which the time domain index is not obtained. In this case, the terminal may further use at least one of ID information, CP length information, and SS block frequency location (BP index) information. The ID information may correspond to a cell ID obtained from an NR-PSS/SSS. The CP length may indicate the normal CP or the extended CP. Here, the CP length predetermined between the base station and the terminal before decoding the NR-PBCH may be applied. The SS block frequency location index information may correspond to an index value about the frequency location of the SS block within the system bandwidth of a single CC.

The following Equation 5 and Equation 6 represent examples of $C_{init}$ that is an initial value of a PN sequence.

$$c_{init} = 2 \cdot N_{ID}^{cell} + N_{CP}$$ [Equation 5]

$$c_{init} = N_{ID}^{cell}$$ [Equation 6]

Referring to Equation 5 and Equation 6, the initialization of the PN sequence may be performed based on an NR cell ID or based on the NR cell ID and an initial value of the CP length.

As described above, based on a scrambling generation unit, a value of n in Equation 1 may be determined using one of the following examples:
- number of DMRS REs per PRB (i.e., indicates that a sequence is generated per OFDM symbol).
- number of DMRS REs per PRB*2 OFDM symbols (i.e., indicates that a sequence is generate per SS block).
- number of DMRS REs per PRB*2 OFDM symbols*number of SS blocks per slot(s) (i.e., indicates that a sequence is generated per slot(s)).
- number of DMRS REs per PRB*2 OFDM symbols*number (L) of SS blocks per SS burst set unit (i.e., indicates that a sequence is generated per SS burst set unit).
- number of DMRS REs per PRB*2 OFDM symbols*number of SS blocks per slot(s)*number of slots per 80 ms (i.e., indicates that a sequence is generated per 80 ms).

Hereinafter, a method of mapping a DMRS to an RE is described.

Figure 8:
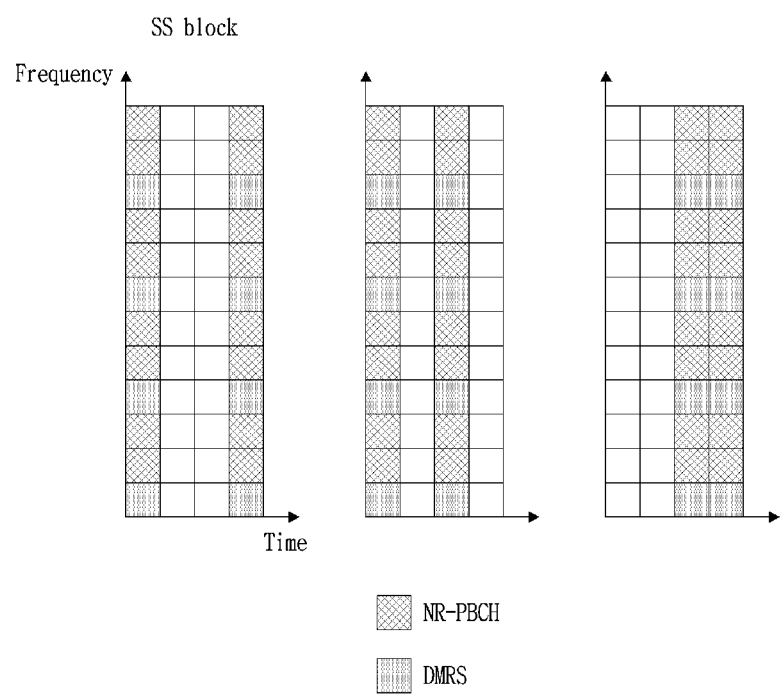
FIGS. 8 and 9 illustrate examples of a location of a DeModulation Reference Signal (DMRS) Resource Element (RE) per PRB for a NR-Physical Broadcast Channel (NR-PBCH) in an SS block.
Figure 9:
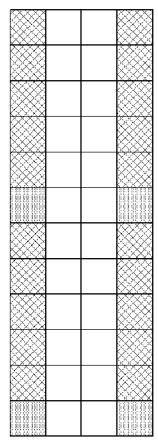
Figure 9:
Figure 9:

FIGS. 8 and 9 illustrate examples of a location of a DMRS RE per PRB for an NR-PBCH in an SS block according to the present disclosure.

Within a single PRB, 2, 4, or 6 REs may be uniformly allocated for the DMRS in a frequency domain. A location of an OFDM symbol to which the NR-PBCH and the DMRS are allocated in the SS block is not limited to the examples of FIGS. 8 and 9. The NR-PBCH and the DMRS may be allocated to an OFDM symbol at a different location.

According to the present disclosure, at least one of a frequency domain shift and a time domain shift may be applied to the DMRS RE.

Since the NR-PBCH DMRS is transmitted at a fixed frequency location, intercell interference may occur between DMRSs of transmission and reception points (TRPs) or neighboring cells. Dissimilar to a PDSCH or a Physical Uplink Shared Channel (PUSCH), a degree of freedom capable of adjusting an MCS and selective frequency scheduling may not be provided for the NR-PBCH transmission. Accordingly, there is a need for a method of avoiding interference between neighboring cell DMRSs.

Initially, the frequency domain shift is described.

Figure 10:
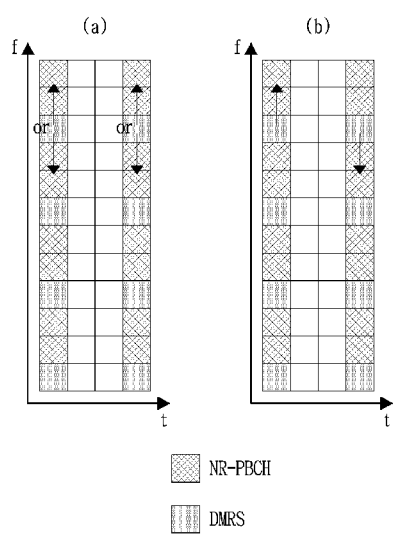
FIG. 10 illustrates examples of a DMRS frequency domain shift.

FIG. 10, parts (a) and (b), illustrate examples of a DMRS frequency domain shift according to the present disclosure.

With respect to a DMRS for an NR-PBCH, a shift may be applied to a frequency axis based on a predetermined ID and/or a BP index and/or SS block/SS burst/SS burst set index value. Hereinafter, although a description is made based on an example in which only the predetermined ID value is applied, it is provided as an example only. Thus, without being limited thereto, the shift may be applied based on the ID value and the SS block index. The frequency domain shift may be applied based on the example of FIG. 10, part (a) or (b).

V_dmrs_shift denotes a shift level (or size) that is applied in a frequency domain and may be represented as an RE unit. For example, the V_dmrs_shift value may be obtained through a mod operation between the ID value and a number of REs shiftable among DMRS REs. The ID value may be one of various ID values, such as a cell ID, a UE ID, a virtual ID, and the like.

FIG. 10, part (a), illustrates an example in which all of the NR-PBCH OFDM symbols associated with DMRS transmission are shifted based on the single same V_dmrs_shift value.

FIG. 10, part (b), illustrates an example in which OFDM symbols for the NR-PBCH are independently shifted based on a plurality of different V_dmrs_shift values, respectively, (e.g., a value of V_dmrs_shift #0 is applied to NR-PBCH/DMRS OFDM symbol #0 and a value of V_dmrs_shift #1 is applied to NR-PBCH/DMRS OFDM symbol #1).

If a DMRS TTI unit (or a DMRS sequence generation unit) is a slot/SS block and four REs are set for the DMRS transmission within a single PRB on a single NR-PBCH/DMRS OFDM symbol, values of V_dmrs_shift #0 and V_dmrs_shift #1 may be determined according to the following Equation 7.

$$V\_drms\_shift\ \#0 = ID \bmod 3$$

$$V\_dmrs\_shift\ \#1 = floor(ID,3) \bmod 3$$

For example, available combinations of V_dmrs_shift #0 and V_dmrs_shift #1 values may be (0, 0), (1, 0), (2, 0), (0, 1), (1, 1), (2, 1), (0, 2), (1, 2), and (2, 2).

If the DMRS TTI unit (or the DMRS sequence generation unit) is a slot/SS block and two REs are set for the DMRS transmission within a single PRB on a single NR-PBCH/DMRS OFDM symbol, values of V_dmrs_shift #0 and V_dmrs_shift #1 may be determined according to the following Equation 8.

$$V\_dmrs\_shift\ \#0 = ID \bmod 6$$

$$V\_dmrs\_shift\ \#2 = floor(ID,6) \bmod 6 \quad \text{[Equation 8]}$$

Hereinafter, a time domain shift is described.

Figure 11:
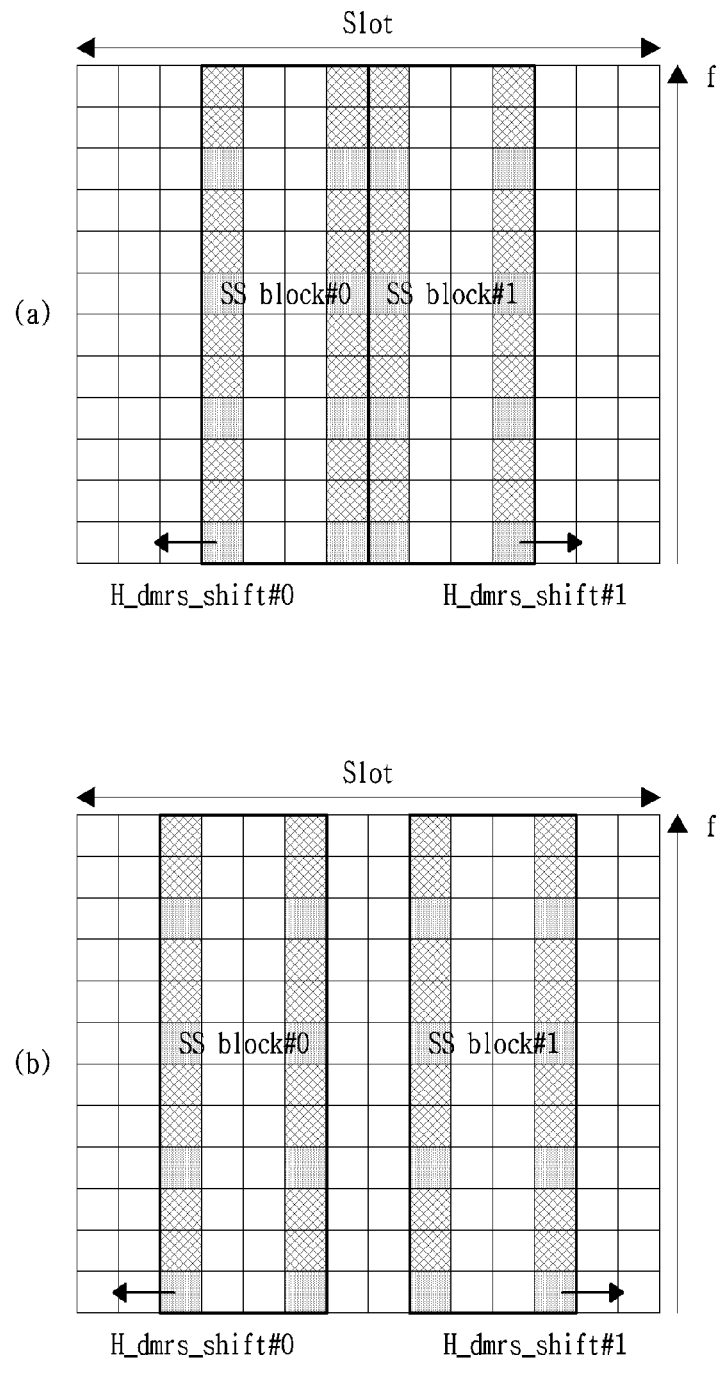
FIG. 11 illustrates examples of a DMRS time domain shift.

FIG. 11, parts (a) and (b), illustrates examples of a DMRS time domain shift according to the present disclosure.

With respect to a DMRS for an NR-PBCH, a shift may be applied to a frequency axis based on a predetermined ID (e.g., cell ID, UE ID, virtual ID) and/or BP index and/or an SS block/SS burst/SS burst set index values. Hereinafter, although a description is made based on an example in which only the predetermined ID value is applied, it is provided as an example only. Thus, without being limited thereto, the shift may be applied based on the predetermined ID value and the SS block index. The time domain shift may be applied based on the example of FIG. 11, part (a) or part (b).

H_dmrs_shift denotes a shift level (or size) that is applied in a time domain and may be represented as an OFDM symbol unit. If a single SS block or two SS blocks are present within a single slot, H_dmrs_shift may be performed based on an OFDM symbol unit. A terminal may obtain an OFDM symbol boundary and a cell ID through NR-PSS/SSS blind monitoring, an actual time location of the SS block in an actual slot may be estimated based on the cell ID value.

In the time domain, an SS block location in the slot may be shifted only within the slot or a partial time domain (e.g., 7 OFDM symbols) based on the ID value. If two SS blocks are present within a single slot and each of the two blocks divides the slot to a half and shifts to the time domain as shown in the example of FIG. 11, the shift may be performed in the time domain based on a value of H_dmrs_shift that is determined based on the ID value according to the following Equation 9. Accordingly, the DMRS location on the time domain may be modified based on the ID value. Other examples in addition to Equation 9 may be applied.

$$H\_dmrs\_shift\_SSblock\ \#0 = ID \bmod 3,$$

$$H\_dmrs\_shift\_SSblock\ \#1 = ID \bmod 3 \quad \text{[Equation 9]}$$

In Equation 9, H_dmrs_shift_SSblock #0 denotes a time domain shift value that is applied to SS block index #0 within a single slot and H_dmrs_shift_SSblock #1 denotes a time domain shift value that is applied to SS block index #1 within a single slot.

According to the present disclosure, all of the frequency domain shift and the time domain shift may be applied to the DMRS RE for the NR-PBCH. Accordingly, although the NR-PBCH DMRSs transmitted from different cells or TRPs are transmitted on the same subcarrier based on the same V_shift value, the NR-PBCH DMRSs may be transmitted on different OFDM symbols based on different H_shift values, thereby maximizing the interference avoidance performance. Accordingly, the demodulation performance of the NR-PBCH may be significantly enhanced.

Figure 12:
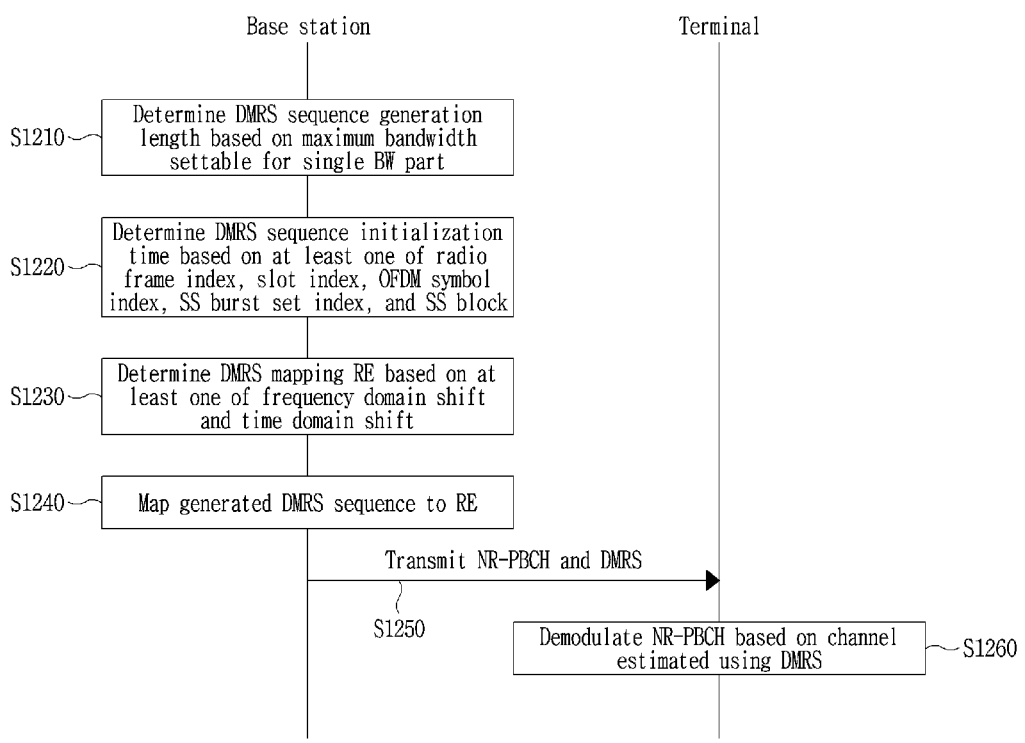
FIG. 12 illustrates an example of a method of transmitting and receiving a DMRS for an NR-PBCH.

FIG. 12 illustrates an example of a method of transmitting and receiving a DMRS for an NR-PBCH according to the present disclosure.

Referring to FIG. 12, in operation S1210, a base station may determine a DMRS sequence generation length based on a maximum bandwidth (i.e., $N^{max,DMRS}_{RB}$) settable for a single BW part. In detail, in Equation 1, a value of $N^{max,DMRS}_{RB}$ may be determined based on at least one of $K_{max,BWpart}$, $N^{max,SSblock}_{RB}$, and $N^{max,BWPart}_{PRB}$ according to one of Equation 2 through Equation 4.

Also, in Equation 1, the DMRS sequence generation length may be determined based on n and $N^{max,DMRS}_{RB}$. For example, a sequence may be generated and initialized per OFDM symbol, per SS block, per slot, per SS burst set, or per 80 ms. Accordingly, a length of the sequence generated based on a single same initial value may be differently determined.

In operation S1220, the base station may determine a DMRS sequence initialization and generation time. An input value for DMRS sequence initialization may be determined based on at least one of a radio frame index, a slot index, an OFDM symbol index, an SS burst set index, and an SS block index. If the terminal does not obtain time index information in advance due to a failure in obtaining SS block index information, the terminal performs the DMRS sequence generation based on at least one of a predetermined ID (e.g., cell ID), a CP length, and BP index information.

In operation S1230, the base station may determine an RE to which the generated DMRS sequence is to be mapped. Here, the DMRS mapping RE may be determined by applying at least one of a frequency domain shift and a time domain shift based on the predetermined ID.

In operation S1240, the base station may map the DMRS sequence to the determined RE.

In operation S1250, the base station may transmit an NR-PBCH and a DMRS for demodulation of the NR-PBCH to the terminal.

In operation S1260, the terminal may receive the DMRS based on known information (i.e., the same information as information used by the base station for the DMRS sequence generation and RE mapping) regarding the DMRS sequence generation length, initialization time, mapping RE location, and the like, and may estimate a channel based on the received DMRS. Also, the UE may perform the NR-PBCH demodulation based on the estimated channel.

Figure 13:
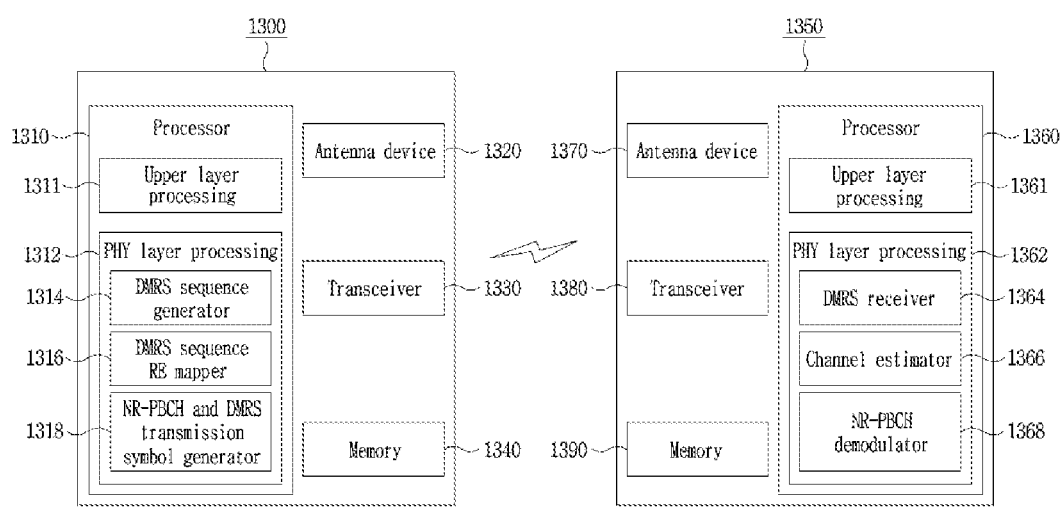
FIG. 13 is a diagram illustrating configurations of a base station device and a user equipment (UE) device.

FIG. 13 illustrates a configuration of a base station device and a terminal device according to the present disclosure.

Referring to FIG. 13, a base station device may include a processor 1310, an antenna device 1320, a transceiver 1330, and a memory 1340.

The processor 1310 may perform baseband-related signal processing and may include an upper layer processing 1311 and a physical (PHY) layer processing 1312. The upper layer processing 1311 may perform an operation of a Medium Access Control (MAC) layer, a Radio Resource Control (RRC) layer, or more upper layer. The physical layer processing 1312 may process an operation (e.g., UL received signal processing and DL transmission signal processing) of a physical (PHY) layer. The processor 1310 may control the overall operation of the base station device in addition to performing the baseband-related signal processing.

The antenna device 1320 may include at least one physical antenna. If the antenna device 1320 includes a plurality of antennas, Multiple Input Multiple Output (MIMO) transmission and reception may be supported. The transceiver 1330 may include a radio frequency (RF) transmitter and an RF receiver. The memory 1340 may store operation processed information of the processor 1310 and software, an operating system (OS), an application, etc., associated with an operation of the base station device 1300, and may include a component such as a buffer.

The processor 1310 of the base station device may be configured to implement an operation of a base station in the embodiments disclosed herein.

The upper layer processing 1311 of the processor 1310 may generate control information included in a MIB transmitted through an NR-PBCH and may transfer the generated control information to the physical layer processing 1312 through a PBCH.

The physical layer processing 1312 of the processor 1310 may include a DMRS sequence generator 1314, a DMRS sequence RE mapper 1316, and an NR-PBCH and DMRS transmission symbol generator 1318.

The DMRS sequence generator 1314 may determine a DMRS sequence generation length based on a maximum bandwidth (i.e., $N^{max,DMRS}_{RB}$) settable for a single BW part. In detail, in Equation 1, $N^{max,DMRS}_{RB}$ may be determined based on at least one of $K_{max,Bwpart}$, $N^{max,SSblock}_{RB}$, and $N^{max,BWpart}_{PRB}$ according to one of Equation 2 through Equation 4.

Also, in Equation 1, the DMRS sequence generator 1314 may determine the DMRS sequence generation length based on n and $N^{max,DMRS}_{RB}$. For example, the DMRS sequence generator 1314 may generate a DMRS sequence per OFDM symbol, per SS block, per slot, per SS burst set, or per 80 ms. Accordingly, a length of the sequence generated based on a single same initial value may be differently determined.

Also, the DMRS sequence generator 1314 may determine a DMRS sequence initialization time. An input value for DMRS sequence initialization may be determined based on at least one of a radio frame index, a slot index, an OFDM symbol index, an SS burst set index, and an SS block index.

The DMRS sequence RE mapper 1316 may determine an RE to which the generated DMRS sequence is to be mapped. Here, the DMRS mapping RE may be determined by applying at least one of a frequency domain shift and a time domain shift based on the predetermined ID. The DMRS sequence RE mapper 1316 may map the DMRS sequence to the determined RE.

Once RE mapping of the DMRS and NR-PBCH is completed, the NR-PBCH and DMRS transmission symbol generator 1318 may generate a symbol (e.g., an OFDM symbol) to be transmitted. The generated transmission symbol may be transmitted to a terminal device 1350 through the transceiver 1330.

The terminal device 1350 may include a processor 1360, an antenna device 1370, a transceiver 1380, and a memory 1390.

The processor 1360 may perform baseband-related signal processing and may include an upper layer processing 1361 and a physical (PHY) layer processing 1362. The upper layer processing 1361 may perform an operation of a MAC layer, an RRC layer, or more upper layer. The physical layer processing 1362 may process an operation (e.g., UL received signal processing and DL transmission signal processing) of a physical (PHY) layer. The processor 1360 may perform the overall operation of the terminal device 1350 in addition to performing the baseband-related signal processing.

The antenna device 1370 may include at least one physical antenna. If the antenna device 1370 includes a plurality of antennas, MIMO transmission and reception may be supported. The transceiver 1380 may include an RF transmitter and an RF receiver. The memory 1390 may store operation processed information of the processor 1360 and software, an OS, an application, etc., associated with an operation of the terminal device 1350, and may include a component such as a buffer.

The processor 1360 of the terminal device 1350 may be configured to implement an operation of a terminal in the embodiments disclosed herein.

The physical layer processing 1362 of the processor 1360 may include a DMRS receiver 1364, a channel estimator 1366, and an NR-PBCH demodulator 1368.

The DMRS receiver 1364 may receive the DMRS based on known information (i.e., the same information as information used by the base station for the DMRS sequence generation and RE mapping) regarding the DMRS sequence generation length, initialization time, mapping RE location, and the like.

The channel estimator 1366 may estimate a channel based on the received DMRS.

The NR-PBCH demodulator 1368 may perform NR-PBCH demodulation based on the estimated channel.

The description made in the embodiments may be applied to operations of the base station device 1300 and the terminal device 1350 and thus, a repeated description is omitted.

An apparatus (e.g., the base station device 1300) may include a processor and a transmitter. The processor may determine, based on at least one of a synchronization signal (SS) block index or a half-frame timing index, an initialization value for a reference signal associated with a physical broadcast channel (PBCH), may generate, based on the initialization value, the reference signal associated with a PBCH, and may map, based on one or more of a frequency domain shift value or a time domain shift value, the generated reference signal to one or more resource elements (REs). The transmitter may transmit, to a terminal (e.g., the terminal device 1350), the mapped reference signal and the PBCH.

The initialization value may be determined based on a cell identifier, the SS block index and the half-frame timing index. The half-frame timing index may correspond to a 1-bit value indicating a first half-frame of a radio frame or a second half-frame of the radio frame. The SS block index may correspond to an index of an SS block, the SS block comprising a PBCH, a primary synchronization signal, and a secondary synchronization signal. The cell identifier may be associated with an identifier of a base station that is associated with the terminal.

The REs may be included in an SS block corresponding to the SS block index. The SS block corresponding to the SS block index may comprise at least four orthogonal frequency division multiplexing (OFDM) symbols. For example, a first OFDM symbol of the at least four OFDM symbols may comprise a primary synchronization signal, a second OFDM symbol of the at least four OFDM symbols may comprise a portion of the PBCH, and a third OFDM symbol of the at least four OFDM symbols may comprise a secondary synchronization signal. The second OFDM symbol may be located between the first OFDM symbol and the second OFDM symbol. The third OFDM symbol may be located between the second OFDM symbol and a fourth OFDM symbol of the at least four OFDM symbols. Another portion of the PBCH may be mapped in the second OFDM symbol and the fourth OFDM symbol. A demodulation reference signal (DM-RS) associated with the PBCH may be mapped in the second, third and fourth OFDM symbols. The processor may initialize, for each SS block, a scrambling sequence and generate, based on the initialized scrambling sequence, a reference signal associated with a PBCH.

Hereinafter, additional embodiments of the present disclosure regarding the PBCH DMRS sequence are described.

The following embodiments may be combined with the embodiments described with reference to FIGS. 1 through 13 and may be applied as separate embodiments.

Embodiment A: Gold Sequence Order 31 (N=31)

A pseudo-random (PN) sequence may be used as a reference signal sequence to generate a reference signal. A single sequence is provided based on a gold sequence that is generated through a bit-by-bit modular 2 operation on two m-sequences. Here, each of the two m-sequences is generated based on a $31^{st}$ order primitive polynomial. Here, the $31^{st}$ order primitive polynomial may be implemented as a Linear Feedback Shift Register (LFSR) with a length (or a size) of 31. Thus, the PN sequence based on the gold sequence may be regarded as a two-stage configuration using the LFSR with the size of 31.

In Equation 10, c(n) denotes the PN sequence based on the gold sequence with the length of $M_{PN}$. Here, n=0, 1, . . . , $M_{PN}$–1. Also, $x_1(n)$ denotes a first m-sequence (sequence) and $x_2(n)$ denotes a second m-sequence. $N_c$ is considered to use the generated sequence starting from a sequence index that is generated by $N_c$ or more without affecting an initial value. $N_c$ is a value that is given to obtain a further random value and thus, $N_c$=1600. However, it is provided as an example only and is not limited thereto. Also, hereinafter, "mod A" denotes a modular A operation and corresponds to an operation of obtaining a remaining value after division with A.

The PN sequence generation may be defined using gold sequence order N. Order of the gold sequence may be determined based on a number of system parameters required as an initialization bit at the NR system or operation complexity of the system. For example, as shown in the following equation, two polynomials $1^{st}$: x31+x3+1 and $2^{nd}$: x31+x3+x2+1+1 based on the gold sequence with order 31 may be used. To generate the PN sequence, an initial value ($C_{init}$) may be configured as described using a cell ID or combination of the cell ID and other information (e.g., 2 or 3 bits of an SS block index, 1 or 4 bits of an OFDM symbol index, 5 ms timing, etc.). Next, it is finally mapped to a PBCH DMRS RE using a Binary Phase Shift Keying (BPSK) or QPSK modulation scheme and thereby transmitted.

As one example, the PN sequence with order N=31 may be generated based on two polynomials as follows. A PN sequence based on a gold sequence with another order may be generated using the following proposed $C_{init}$ values based on another polynomial.

$c(n)=(x_1(n+N_c)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 10]

$N_c$=1600 and the $1^{st}$ polynomial is initialized to $x_1(0)=1$, $x_1(n)=0$. Here, n=1, 2, . . . , 30. The $2^{nd}$ polynomial is determined as $c_{init}=\Sigma_{i=0}^{30}x_2(i)\cdot 2^i$. The following proposed $C_{init}$ value is used to determine an initial value of the $2^{nd}$ polynomial using a scheme such as $$x_2(i) = \left\lfloor \frac{c_{init}}{2^i} \right\rfloor \bmod 2, i = 0, 1, \ldots, 30.$$

Embodiment B: Gold Sequence Order N>31

As described above, a method of generating a PN sequence based on a gold sequence with another order may be considered. Considering the slot index range (240 subcarrier spacing: 160 (8 bits), 480 subcarrier spacing: 320 (9 bits)) that is currently increased in the NR system, an OFDM symbol index (14, 4 bits), a cell ID (10 bits), a number of codewords (1 bit), a number of RNTIs (16 bits), etc., at least 36-bit initial value may be required. Accordingly, the gold sequence with order 31 may not meet such requirements.

The PN sequence based on the gold sequence with order greater than the gold sequence order 31 may be generated. Likewise, two m-sequences are generated based on two primitive polynomials, respectively. Here, order of each of the $1^{st}$ primitive polynomial and the $2^{nd}$ primitive polynomial corresponds to N (n>31). Values of coefficients $a_i$ and $b_j$ (i{N–1, N–2, . . . , 1, 0} and j{N–1, N–2, . . . , 1, 0}) added to the $1^{st}$ and $2^{nd}$ polynomials of Equation 11, respectively, may be 0 or 1.

$1^{st}: x^N+a_{N-1}x^{N-1}+a_{N-2}x^{N-2}+\ldots+a_1x^1+a_0$ $2^{nd}: x^N+b_{N-1}x^{N-1}+b_{N-2}x^{N-2}+\ldots+b_1x^1+b_0$ [Equation 11]

The $1^{st}$ primitive polynomial may be an irreducible primitive polynomial with order of N.

The 2nd primitive polynomial refers to a primitive polynomial having, as an m-sequence, $x_1((q\cdot n)\bmod 2^N-1)$ that is a sequence generated by sampling $x_1(n)$ with q if the m-sequence generated based on the $1^{st}$ primitive polynomial is $x_1(n)$. Accordingly, if the m-sequence generated based on the $2^{nd}$ primitive polynomial is $x_2(n)$, $x_2(n)=x_1((q\cdot n)\bmod 2^N-1)$. Here, q is derived according to the following Equation 12 and is an odd number at all times.

$$q = 2^k + 1 \text{ or } q = 2^{2k} - 2^k + 1$$ [Equation 12]

$$gcd(N, k) = \begin{cases} 1 & \text{for } N \text{ odd} \\ 2 & \text{for } N = 2 \pmod 4 \end{cases}$$

In Equation 12, k value may be obtained based on a correlation between the polynomial order (N) and the k value. Accordingly, a single k value or a plurality of k values may be present based on an N value. gcd(N,k) denotes a greatest common divisor operation between N and k.

Any gold sequence order that does not meet the above condition is excluded from the following Table 1. That is, gold sequence order that is a multiple of 4 (N mod 4=0) is unused for gold sequence generation.

Hereinafter, an example of the method of generating the gold sequence with order greater than gold sequence order 31 is described. In the case of gold sequence order 45 (N=45, N denotes an odd number), a $1^{st}$ primitive polynomial for a $1^{st}$ m-sequence may be selected by referring to the following Table 1.

The following Table 1 shows examples of primitive polynomials if N>31.

TABLE 1

| Order of Gold sequence (N) | Primitive Polynomial for $1^{st}$ m-sequence(x1) |
|---|---|
| 33 | 33 6 4 1 0 |
| 34 | 34 7 6 5 2 1 0 |
| 35 | 35 2 0 |
| 37 | 37 5 4 3 2 1 0 |
| 38 | 38 6 5 1 0 |
| 39 | 39 4 0 |
| 41 | 41 3 0 |
| 42 | 42 5 4 3 2 1 0 |
| 43 | 43 6 4 3 0 |
| 45 | 45 4 3 1 0 |
| 46 | 46 8 5 3 2 1 0 |
| 47 | 47 5 0 |
| 49 | 49 6 5 4 0 |
| 50 | 50 4 3 2 0 |
| 51 | 51 6 3 1 0 |
| 53 | 53 6 2 1 0 |
| 54 | 54 6 5 4 3 2 0 |
| 55 | 55 6 2 1 0 |
| 57 | 57 5 3 2 0 |
| 58 | 58 6 5 1 0 |
| 59 | 59 6 5 4 3 1 0 |
| 61 | 61 5 2 1 0 |
| 62 | 62 6 5 3 0 |
| 63 | 1 0 |

For example, if N=45, the $1^{st}$ primitive polynomial may be represented as x45+x4+x3+x1+1, which means the same as $x_1(n+45)=(x_1(n+4)+x_1(n+3)+x_1(n+3)+x_1(n+1)+x_1(n))$ mod 2.

As described above, a $2^{nd}$ m-sequence is generated by collecting every $q^{th}$ sample $x_2(n)=x_1((q \cdot n) \bmod 2^N-1)$ of the $1^{st}$ m-sequence that is generated based on the $1^{st}$ primitive polynomial. In general, a method of generating a sequence by collecting every $q^{th}$ sample generates the same sequence as one that is generated using a method of generating the $2^{nd}$ m-sequence by defining the $2^{nd}$ primitive polynomial for $2^{nd}$ m-sequence generation. A condition to make the $1^{st}$ m-sequence and the $2^{nd}$ m-sequence as a preferred pair follows as:

The polynomial order (N) is not a multiple of 4 and an odd number or an N value with N mod 4=2.

Here, q and gcd(N,k) may be derived according to Equation 12. Thus, q is an odd number at all times.

Here, using the above scheme, the k value may be obtained based on the correlation between the gold sequence polynomial order (N) and the k value. Accordingly, a single k value or a plurality of k values may be present based on the N value. gcd(N,k) denotes a greatest common divisor operation between N and k.

A result of applying the $C_{init}$ value to the generated $2^{nd}$ m-sequence is the same as a result of performing a cyclic shift on the sequence. Accordingly, the cyclic shift may be performed by a length ($2^N-1$, N=polynomial order) of the gold sequence. That is, the sequence that is cyclically shifted based on a random value between 1 and $2^N-1$ may be generated. The random value corresponds to a specific $C_{init}$ value. For example, if a sequence is generated by defining a specific value (e.g., cell ID) as the $C_{init}$ value as the following proposed method, the generated sequence may be regarded as the same sequence that is cyclically shifted by a cell ID value.

As a result, if gold sequence order N=45, the PN sequence based on the gold sequence may be generated as represented by the following Equation 13.

$c(n)=(x_1(n+N_c)+x_2(n+N_c))$ mod 2

$x_1(n+45)=(x_1(n+4)+x_1(n+3)+1)$ mod 2

$x_2(n)=x_1(q \cdot n) \cdot T^i, i=1, \ldots N-1$ [Equation 13]

$N_c=1600$ and the $1^{st}$ polynomial is initialized to $x_1(0)=1$, $x_1(n)=0$. Here, n=1, 2, . . . , 30. Also, q=3 (n=odd). Therefore, the $x_2$ sequence (the $2^{nd}$ m-sequence) may be generated by collecting every $3^{rd}$ sample of the $x_1$ sequence (the $1^{st}$ m-sequence). The final $x_2$ sequence (the $2^{nd}$ m-sequence) is generated by cyclically shifting the $x_2$ sequence based on a cyclic shift ($T^i$) value corresponding to the $C_{init}$ value as represented by Equation 13.

As another representation scheme, the final $2^{nd}$ sequence may be generated based on the following proposed $C_{init}$ value by defining the $2^{nd}$ primitive polynomial for $2^{nd}$ sequence generation, which is similar as described in the example of N=31. In this case, the $2^{nd}$ sequence is determined as $c_{init}=\Sigma_{i=0}^{N-1} x_2(i) \cdot 2^i$ using the same scheme as that used in the example of N=31. The following proposed $C_{init}$ value is used to determine an initial value of the $2^{nd}$ polynomial using a scheme such as $$x_2(i) = \left\lfloor \frac{C_{init}}{2^i} \right\rfloor \bmod 2, \; i = 0, 1, \ldots, N-1.$$

Embodiment C: Gold-Like Sequence Order N=36

As described above, a PN sequence based on a gold-like sequence with order greater than 31 may be generated. For example, the PN sequence is generated with two polynomials based on the gold-like sequence with order 36 as represented by the following Equation 14.

$c(n)=(x_1(n+N_c)+x_2(n+N_c))$ mod 2

$x_1(n+36)=(x_1(n+6)+x_1(n+5)+x_1(n+4)+x_1(n+2)+x_1(n+1)+1)$ mod 2

$x_2(n+36)=(x_2(n+35)+x_2(n+34)+x_2(n+32)+x_2(n+31)+x_2(n+30)+1)$ [Equation 14]

$N_c=1600$ and the $1^{st}$ polynomial is initialized to $x_1(0)=1$, $x_1(n)=0$. Here, n=1, 2, . . . , 35. The $2^{nd}$ polynomial is determined as $c_{init}=\Sigma_{i=0}^{35} x_2(i) \cdot 2^i$. The following proposed $C_{init}$ value is used to determine an initial value of the $2^{nd}$ polynomial using a scheme such as $$x_2(i) = \left\lfloor \frac{C_{init}}{2^i} \right\rfloor \bmod 2, \; i = 0, 1, \ldots, 35.$$

[Definition of $C_{init}$ Required for Gold (Gold-Like) Sequence Generation]:

1. Initialization of PBCH DMRS Sequence per SS Block

When generating the PN sequence based on one of the proposed gold sequences, $C_{init}$ values may be configured using one of examples shown in the following Equation 15, including $N^{cell}_{ID}$ and $n_{ssblock}$.

$c_{init}=(n_{ssblock}+1) \cdot (2N_{ID}^{cell}+1) \cdot 2^{10}+N_{ID}^{cell}$ or $c_{init}=n_{ssblock} \cdot 2^{10}+N_{ID}^{cell}$ or $c_{init}=(N_{ID}^{cell}+1)\cdot(2n_{ssblock}+1)\cdot 2^3+n_{ssblock}$ or $c_{init}=N_{ID}^{cell}\cdot 2^3+n_{ssblock}$ [Equation 15]

The sequence needs to be initialized using one of the $C_{init}$ values at start of each SS block within an SS burst set.

That is, generation of a PBCH reference signal within an SS block is performed per SS block and a number of reference signals corresponding to two OFDM symbols are generated and mapped.

If information about an SS block transmission interval (5 ms) needs to be additionally transferred through the PBCH DMRS sequence in addition to the aforementioned information, $N_{5ms}^{SSblock}$ may be considered to determine the $C_{init}$ value as represented by the following Equation 16.

$c_{init}=(n_{ssblock}+1)\cdot(2N_{ID}^{cell}+1)\cdot 2^{11}+2\cdot N_{ID}^{cell}+N_{5ms}^{SSblock}$ or $c_{init}=n_{ssblock}\cdot 2^{11}+2\cdot N_{ID}^{cell}+N_{5ms}^{SSblock}$ or $c_{init}=(N_{ID}^{cell}+1)\cdot(2n_{ssblock}+1)\cdot 2^4+2\cdot n_{ssblock}+N_{5ms}^{SSblock}$ or $c_{init}=N_{ID}^{cell}\cdot 2^4+2\cdot n_{ssblock}+N_{5ms}^{SSblock}$ [Equation 16]

The sequence needs to be initialized using one of the $C_{init}$ values at start of each SS block within an SS burst set.

2. Initialization of PBCH DMRS Sequence per OFDM Symbol within SS Block

When generating the PN sequence based on one of the proposed gold sequences, $C_{init}$ values may be configured using one of examples shown in the following Equation 17, including $N^{cell}_{ID}$ and $n_{ssblock}$.

$c_{init}=(2*(n_{ssblock}+1)+l'+1)\cdot(2N_{ID}^{cell}+1)\cdot 2^{10}+N_{ID}^{cell}$ or $c_{init}=(2*(n_{ssblock}+1)+l'+1)\cdot 2^{10}+N_{ID}^{cell}$ or $c_{init}=(l+1)(2\cdot N_{ID}^{cell}+1)\cdot 2^{13}+N_{ID}^{cell}\cdot 2^3+n_{ssblock}$ or $c_{init}=l\cdot 2^{13}+n_{ssblock}\cdot 2^{10}+N_{ID}^{cell}$ The sequence needs to be initialized with the $C_{init}$ value at start of an OFDM symbol within each SS block of the SS burst set.

If information about an SS block transmission interval (5 ms) needs to be transferred through the PBCH DMRS sequence, the $C_{init}$ value may be defined as represented by the following Equation 18.

$c_{init}=(2*)(n_{ssblock}+1)+l'+1)\cdot(2N_{ID}^{cell}+1)\cdot 2^{11}+2\cdot N_{ID}^{cell}+N_{5ms}^{SSblock}$ or $c_{init}=(2*(n_{ssblock}+1)+l'+1)\cdot 2^{10}+2\cdot N_{ID}^{cell}+N_{5ms}^{SSblock}$ or $c_{init}=2^{11}(\bar{n}_{ssblock}+1)(\lfloor N_{ID}^{cell}/4\rfloor+1)+2^6(\bar{n}_{ssblock}+1)+(N_{ID}^{cell} \mod 4)$ $\bar{n}_{ssblock}=n_{ssblock}+N_{5ms}^{SSblock}$ [Equation 18]

The sequence needs to be initialized with the $C_{init}$ value at start of an OFDM symbol within each SS block of the SS burst set.

Parameters considered in the PBCH DMRS sequence initialization follow as:

$n_{ssblock}$: has the range of 0~3 (2 bits) or 0~7(3 bits) as an SS block index transferred through the PBCH DMRS.

In an example in which $n_{ssblock}$ corresponds to 3 bits, the SS block index is transferred using lower 2 bits (e.g., 000, 001, 010, and 011) of 3 bits if L=4 (maximum number of SS blocks), and using all of 3 bits (e.g., 000, 001, 010, 011, 100, 101, 110, and 111) if L=8. If L=64, 6-bit information is transferred to a terminal through combination of $n_{ssblock}$ and an MIB SS block index (e.g., 3($n_{ssblock}$DMRS)+3(MIB)=6 bits). In an example in which $n_{ssblock}$ corresponds to 2 bits, it indicates an SS block index corresponding to 2 bits in the maximum number of SS blocks regardless of the L value. If L=8 or if L=64, the base station may transfer the SS block index corresponding to L=8 and L=64 to the terminal through combination of $n_{ssblock}$ and an SS block index field (3 or 4 bits) within the PBCH MIB. Herein, although the description is made based on the assumption that $n_{ssblock}$ includes 3 bits for clarity of description, the present disclosure is not limited thereto. The proposed method may be applicable to 2 bits or a number of bits different therefrom.

The following Table 2 shows an example of an SS block index indication according to the L value in an example in which the SS block index through the DMRS corresponds to 3 bits.

TABLE 2

| Total SS block quantity (L) | MIB SS block index field (3 bits) | SS Block Index Indicator via DMRS($n_{ssblock}$: 3 bits) |
|---|---|---|
| L = 4 | Unspecified | 000, 001, 010, 011 |
| L = 8 | Unspecified | 000, 001, 010, 011, 100, 101, 110, 111 |
| L = 64 | 000, 001, 010, 011, 100, 101, 110, 111 | 000, 001, 010, 011, 100, 101, 110, 111 |

The following Table 3 shows an example of an SS block index indication according to the L value in an example in which the SS block index through the DMRS corresponds 2 bits.

TABLE 3

| Total SS block quantity (L) | MIB SS block index field (4 bits) | SS Block Index Indicator via DMRS($n_{ssblock}$: 2 bits) |
|---|---|---|
| L = 4 | Unspecified | 00, 01, 10, 11 |
| L = 8 | (0000, 0001) or (0000, 1111) | 00, 01, 10, 11 |
| L = 64 | 0000, 0001, 0010, 0011, 0100, 0101, 0110, 0111, 1000, 1001, 1010, 1011, 1100, 1101, 1110, 1111 | 00, 01, 10, 11 |

$N^{cell}_{ID}$: has the range of 0~1007 (10 bits) as an NR cell ID value.

$N^{SSblock}_{5ms}$: has information on range of 0~1 about SS block transmission interval (5 ms) timing.

l': has an OFDM symbol index of 0~1 or range of 0~13 for PBCH DMRS transmission within an SS block.

$\bar{n}_{ssblock}$: If L=4, $n_{ssblock}$ (i.e., two LSB bits of an SS block index) and half-frame timing $N_{5ms}^{SSblock}$ within a single radio frame are considered in the index together. Alternatively, if L=8 or 64, only $n_{ssblock}$(i.e., three LSB bits of an SS block index) is considered in the index.

[PN Sequence based on Kasami Sequence]:

The PN sequence proposed herein is based on Kasami sequence and a sequence that is generated through a bit-by-bit modular 2 operation on three m-sequences. Here, a 1st m-sequence is generated based on a 1st primitive polynomial, a 2nd m-sequence is generated based on a 2nd primitive polynomial, and a $3^{rd}$ m-sequence is generated based on a $3^{rd}$ primitive polynomial. Here, order of each of the $1^{st}$ primitive polynomial and the $2^{nd}$ primitive polynomial is M and order of the $3^{rd}$ primitive polynomial is M/2. Accordingly, M is an even number. They may be represented by the following Equation 19. Values of coefficients $a_i$, $b_j$, and $c_k$ (i{M−1, M−2, . . . , 1, 0}, j {M−1, M−2, . . . , 1, 0}, and k{M/2−1, M/2−2, . . . , 1, 0}) added to the $1^{st}$, $2^{nd}$, and $3^{rd}$ polynomials of Equation 19, respectively, may be 0 or 1.

$1^{st}$ primitive polynomial $$x^M + a_{M-1}x^{M-1} + a_{M-2}x^{M-2} + \ldots + a_1x + a_0$$

$2^{nd}$ primitive polynomial $$x^M + b_{M-1}x^{M-1} + b_{M-2}x^{M-2} + \ldots + b_1x + b_0$$

$3^{rd}$ primitive polynomial $$x^{M/2} + c_{M/2-1}x^{M/2-1} + c_{M/2-2}x^{M/2-2} + \ldots + c_1x + c_0 \quad \text{[Equation 19]}$$

The $1^{st}$ primitive polynomial may be an irreducible primitive polynomial with order of M.

The $2^{nd}$ primitive polynomial refers to a primitive polynomial having, as an m-sequence, $x_1((f_1 \cdot n) \bmod 2^M - 1)$ that is a sequence generated by sampling $x_1(n)$ with $f_1$ if the m-sequence generated based on the $1^{st}$ primitive polynomial is $x_1(n)$. Accordingly, if the m-sequence generated based on the $2^{nd}$ primitive polynomial is $x_2(n)$, $x_2(n)=x_1((f_1 \cdot n) \bmod 2^M - 1)$.

The $3^{rd}$ primitive polynomial refers to a primitive polynomial having, as an m-sequence, $x_1((f_2 \cdot n) \bmod 2^M - 1)$ that is a sequence generated by sampling $x_1(n)$ with $f_2$ if the m-sequence generated based on the $1^{st}$ primitive polynomial is $x_1(n)$. Accordingly, if the m-sequence generated based on the $3^{rd}$ primitive polynomial is $x_3(n)$, $x_3(n)=x_1((f_2 \cdot n) \bmod 2^M - 1)$.

Here, $n\{0, 1, \ldots, 2^M-2\}$, the sampling value $f_1 = 1 + 2^{(M+2)/2}$, and the sampling value $f_2 = 1 + 2^{M/2}$.

Also, "mod A" denotes a modular A operation and corresponds to an operation of obtaining a remaining value after division with A.

Figure 14:
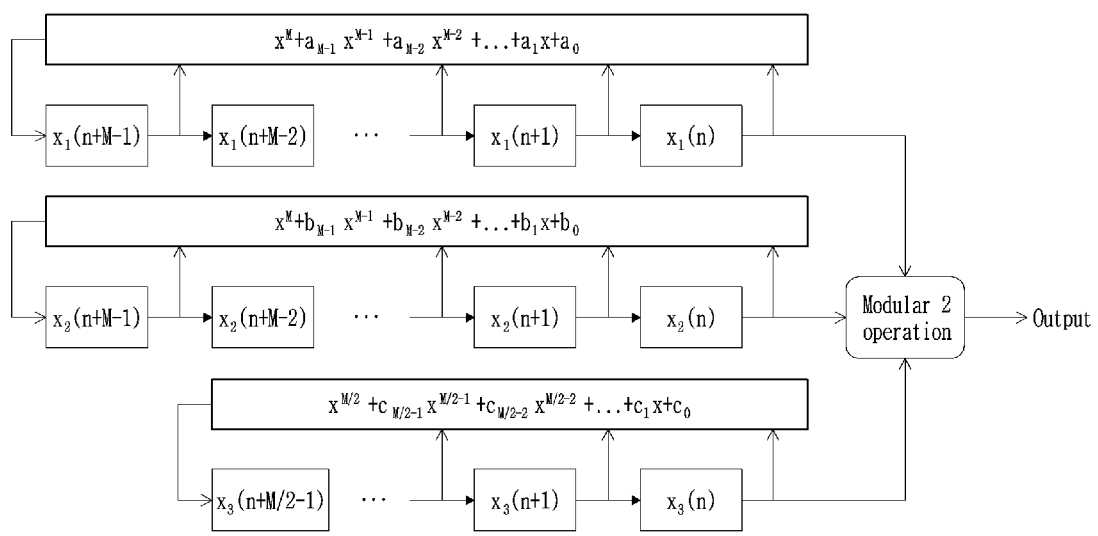
FIG. 14 illustrates an example of generating a pseudo-random (PN) sequence.

Referring to FIG. 14, the $1^{st}$ m-sequence based on the $1^{st}$ primitive polynomial with order of M may be configured as an LFSR with a length or a size of M. Also, the $2^{nd}$ m-sequence based on the $2^{nd}$ primitive polynomial with order of M may be configured as an LFSR with a length or a size of M. Also, the $3^{rd}$ m-sequence based on the $3^{rd}$ primitive polynomial with order of M/2 may be configured as an LFSR with a length or a size of M/2. A final sequence is generated by performing a bit-by-bit modular 2 operation on the three m-sequences through the three LFSRs.

Accordingly, the final sequence may be configured using two LFSRs with the length or the size of M and a single LFSR with the length or the size of M/2, that is, a three-stage configuration including a total of three LFSRs.

The generation scheme may be represented by the following Equation 20. In Equation 20, c(n) denotes the PN sequence with the length of $M_{PN}$, which is proposed herein. Here, $n=0, 1, \ldots, M_{PN}-1$. Also, $x_1(n)$ denotes the $1^{st}$ m-sequence, $x_2(n)$ denotes the $2^{nd}$ m-sequence, and $x_3(n)$ denotes the $3^{rd}$ m-sequence. $N_c$ is considered to use the generated sequence starting from a sequence index that is generated by $N_c$ or more without affecting an initial value. $N_c$ is a value that is given to obtain a further random value and thus, $N_c=1600$. However, it is provided as an example only and is not limited thereto. Thus, other random values may be used. Values of coefficients $a_i$, $b_j$, and $c_k$ (i{M−1, M−2, . . . , 1, 0}, j{M−1, M−2, . . . , 1, 0}, and k{M/2−1, M/2−2, . . . , 1, 0}) added to the $1^{st}$, $2^{nd}$ and $3^{rd}$ polynomials of Equation 20, respectively, may be 0 or 1.

$$c(n) = (x_1(n+N_c) + x_2(n+N_c) + x_3(n+N_c)) \bmod 2$$

$$x_1(n+M) = (a_{M-1}x_1(n+M-1) + a_{M-2}x_1(n+M-2) + \ldots + a_1x_1(n+1) + a_0x_1(n)) \bmod 2$$

$$x_2(n+M) = (b_{M-1}x_2(n+M-1) + b_{M-2}x_2(n+M-2) + \ldots + b_1x_2(n+1) + b_0x_2(n)) \bmod 2$$

$$x_3(n+M/2) = (c_{M/2-1}x_3(n+M/2-1) + c_{M/2-2}x_3(n+M/2-2) + \ldots + c_1x_3(n+1) + c_0x_3(n)) \bmod 2 \quad \text{[Equation 20]}$$

Here, an initial value of the first LFSR for generating the $1^{st}$ m-sequence $x_1(n)$, an initial value of the second LFSR for generating the $2^{nd}$ m-sequence $x_2(n)$, and an initial value of the third LFSR for generating the $3^{rd}$ m-sequence $x_3(n)$ may be given by the following Equation 21. The initial value of the first LFSR may use a fixed initial value and the initial value of the second LFSR and the initial value of the third LFSR may follow $c_{init\_1}$ and $c_{init\_2}$ values based on system parameters, respectively.

Referring to Equation 21, different PN sequences may be generated based on a total of 3M/2-bit system parameter using a maximum of M bits in the initial value $c_{init\_1}$ of the second LFSR and a maximum of M/2 bits in the initial value $c_{init\_2}$ of the third LFSR.

initial value of the 1st m-sequence $$x_1(0) = 1, x_1(n) = 0, n = 1, 2, \ldots, M-1 \quad \text{[Equation 21]}$$

initial value of the 2nd m-sequence $$c_{init\_1} = \sum_{i=0}^{M-1} x_2(i) \cdot 2^i, \; x_2(i) = \left\lfloor \frac{c_{init\_1}}{2^i} \right\rfloor \bmod 2, \; i = 0, 1, \ldots, M-1$$

initial value of the 3rd m-sequence $$c_{init\_2} = \sum_{i=0}^{M/2-1} x_3(i) \cdot 2^i, \; x_3(i) = \left\lfloor \frac{c_{init\_1}}{2^i} \right\rfloor \bmod 2, \; i = 0, 1, \ldots, M/2-1$$

Hereinafter, an example of the PN sequence generation method proposed herein and described with reference to FIG. 14 and Equation 19 through Equation 21 is further described if M=30. M=30 indicates that a largest value is used among even values of M satisfying a 32-bit operation.

The PN sequence proposed herein is a sequence that is generated through a bit-by-bit modular 2 operation on three m-sequences. Here, the $1^{st}$ m-sequence is generated based on the $1^{st}$ primitive polynomial, the $2^{nd}$ m-sequence is generated based on the $2^{nd}$ primitive polynomial, and the $3^{rd}$ m-sequence is generated based on the $3^{rd}$ primitive polynomial. Here, order of each of the $1^{st}$ primitive polynomial and the $2^{nd}$ primitive polynomial is 30 and order of the $3^{rd}$ primitive polynomial is 15. They may be represented by the following Equation 22.

$1^{st}$ primitive polynomial $$x^{30} + x^6 + x^4 + x + 1$$

$2^{nd}$ primitive polynomial $$x^+ + x^{26} + x^{25} + x^{17} + x^{16} + x^{15} + x^{14} + x^{12} + x^{11} + x^9 + x^8 + x^7 + x^3 + x^2 + 1$$

$3^{rd}$ primitive polynomial $$x^{15} + x^{10} + x^9 + x^8 + x^5 + x^3 + 1 \quad \text{[Equation 22]}$$

The 1st primitive polynomial may be an irreducible primitive polynomial with order of 15.

The 2nd primitive polynomial refers to a primitive polynomial having, as an m-sequence, $x_1((f_1 \cdot n) \mod 2^{30}-1)$ that is a sequence generated by sampling $x_1(n)$ with $f_1$ if the m-sequence generated based on the 1st primitive polynomial is $x_1(n)$. Accordingly, if the m-sequence generated based on the 2nd primitive polynomial is $x_2(n)$, $x_2(n)=x_1((f_1 \cdot n) \mod 2^{30}-1)$.

The 3rd primitive polynomial refers to a primitive polynomial having, as an m-sequence, $x_1((f_2 \cdot n) \mod 2^{30}-1)$ that is a sequence generated by sampling $x_1(n)$ with $f_2$ if the m-sequence generated based on the 1st primitive polynomial is $x_1(n)$. Accordingly, if the m-sequence generated based on the 3rd primitive polynomial is $x_3(n)$, $x_3(n)=x_1((f_2 \cdot n) \mod 2^{30}-1)$.

Here, $n\{0, 1, \ldots, 2^{30}-2)$, the sampling value $f_1=1+2^{16}$, and the sampling value $f_2=1+2^{15}$.

Also, "mod A" denotes a modular A operation and corresponds to an operation of obtaining a remaining value after division with A.

Here, the 1st m-sequence based on the 1st primitive polynomial with order of 30 may be configured as an LFSR with a length or a size of 30. Also, the 2nd m-sequence based on the 2nd primitive polynomial with order of 30 may be configured as an LFSR with a length or a size of 30. Also, the 3rd m-sequence based on the 3rd primitive polynomial with order of 15 may be configured as an LFSR with a length or a size of 15. The final sequence is generated by performing a bit-by-bit modular 2 operation on the three m-sequences through the three LFSRs.

Accordingly, the final sequence may be configured using two LFSRs with the length or the size of 30 and a single LFSR with the length or the size of 15, that is, a three-stage configuration including a total of three LFSRs.

The generation scheme may be represented by the following Equation 23. In Equation 23, c(n) denotes the PN sequence with the length of $M_{PN}$, which is proposed here. Here, $n=0, 1, \ldots, M_{PN}-1$. Also, $x_1(n)$ denotes the 1st m-sequence, $x_2(n)$ denotes the 2nd m-sequence, and $x_3(n)$ denotes the 3rd m-sequence. $N_c$ is considered to use the generated sequence starting from a sequence index that is generated by $N_c$ or more without affecting an initial value. $N_c$ is a value that is given to obtain a further random value and thus, $N_c=1600$. However, it is provided as an example only and is not limited thereto. Thus, other random values may be used.

$$c(n)=(x_1(n+N_C)+x_2(n+N_C)+x_2(n+N_C)+x_3(n+N_c)) \mod 2$$

$$x_1(n+30)=(x_1(n+6)+x_1(n+4)+x_1(n+1)+x_1(n)) \mod 2$$

$$x_2(n+30)=(x_2(n+26)+x_2(n+25)+x_2(n+17)+x_2(n+16)+x_2(n+15)+x_2(n+14)+x_2(n+12)+x_2(n+11)+x_2(n+9)+x_2(n+8)+x_2(n+7)+x_2(n+3)+x_2(n+2)+x_2(n)) \mod 2$$

$$x_1(n+15)=(x_3(n+10)+x_3(n+9)+x_3(n+8)+x_3(n+5)+x_3(n)) \mod 2 \quad \text{[Equation 23]}$$

Here, an initial value of the first LFSR for generating the 1" m-sequence $x_i(n)$, an initial value of the second LFSR for generating the 2nd m-sequence $x_2(n)$, and an initial value of the third LFSR for generating the 3rd m-sequence $x_3(n)$ may be given by the following Equation 24. The initial value of the first LFSR may use a fixed initial value and the initial value of the second LFSR and the initial value of the third LFSR may follow $c_{init\_1}$ and $c_{init\_2}$ values based on system parameters, respectively.

Referring to Equation 24, different PN sequences may be generated based on a total 45-bit system parameter using a maximum of 30 bits in the initial value $c_{init\_1}$ of the second LFSR and a maximum of 15 bits in the initial value $c_{init\_2}$ of the third LFSR.

initial value of the 1st m-sequence $$x_1(0)=1, x_1(n)=0, n=1,2,\ldots,29 \quad \text{[Equation 24]}$$

initial value of the 2nd m-sequence $$c_{init\_1}=\sum_{i=0}^{29}x_2(i)\cdot 2^i, \; x_2(i)=\left\lfloor\frac{c_{init\_1}}{2^i}\right\rfloor \mod 2, \; i=0,1,\ldots,29$$

initial value of the rdt m-sequence $$c_{init\_2}=\sum_{i=0}^{14}x_3(i)\cdot 2^i, \; x_3(i)=\left\lfloor\frac{c_{init\_2}}{2^i}\right\rfloor \mod 2, \; i=0,1,\ldots,14$$

[Definition of $C_{init}$ Required for Kasami Sequence Generation]:

1. Initialization of PBCH DMRS Sequence per SS Block

The proposed PN sequence based on the Kasami sequence may be defined based on the following proposed $C_{init}$ values and combinations thereof. Any of the following proposed combinations may be used for each of $C_{init\_1}$ and $C_{init\_2}$ unless they exceed order N ($C_{init\_1}$) and order N/2($C_{init\_2}$).

The following Table 4 shows an example of a method of configuring $C_{init\_1}$ and $C_{init\_2}$ for Kasami sequence generation.

TABLE 4

| PN sequence generation | System parameters for configuring Cinit_1 (order N) for 2nd Polynomial | System parameters for configuring Cinit_2 (order N/2) for 3rd Polynomial |
| --- | --- | --- |
| Example#1 | 1) $N_{ID}^{cell}$, 2) $n_{ssblock}$ | 1) $N_{ID}^{cell}$, 2) $n_{ssblock}$ |
| Example#2-1 | 1) $N_{ID}^{cell}$, 2) $n_{ssblock}$ | - (A fixed value not derived by a system parameter) |
| Example#2-2 | - (A fixed value not derived by a system parameter) | 1) $N_{ID}^{cell}$, 2) $n_{ssblock}$ |
| Example#3-1 | 1) $N_{ID}^{cell}$ | 1) $n_{ssblock}$ |
| Example#3-2 | 1) $n_{ssblock}$ | 1) $N_{ID}^{cell}$ |

Configuration Example of Embodiment A:

$c_{init\_1}=(n_{ssblock}+1)\cdot(2N_{ID}^{cell}+1)\cdot 2^{10}+N_{ID}^{cell}$ (or $c_{init\_1}=n_{ssblock}\cdot 2^{10}+N_{ID}^{cell}$ or $c_{init\_1}=(N_{ID}^{cell}+1)\cdot(2n_{ssblock}+1)\cdot 2^3+n_{ssblock}$ or $c_{init\_1}=N_{ID}^{cell}\cdot 2^3+n_{ssblock}$)

$c_{init\_2}=n_{ssblock}\cdot 2^{10}+N_{ID}^{cell}$ (or $c_{init\_2}=N_{ID}^{cell}\cdot 2^3+n_{ssblock}$)

Configuration Example of Embodiment B-1:

$c_{init\_1}=(n_{ssblock}+1)\cdot(2N_{ID}^{cell}+1)\cdot 2^{10}+N_{ID}^{cell}$ (or $c_{init\_1}=n_{ssblock}\cdot 2^{10}+N_{ID}^{cell}$)

$c_{init\_2}=\sum_{i=0}^{114}x_3(i)\cdot 2^i, x_3(0)=1, x_3(n)=0, n=1,2,\ldots 14$ Configuration Example of Embodiment B-2:

$c_{init\_1}=\sum_{i=0}^{29}x_2(i)\cdot 2^i, x_2(0)=1, x_2(n)=0, n=1,2,\ldots 30$ $c_{init\_2}=(n_{ssblock}+1)\cdot(2N_{ID}^{cell}+1)\cdot 2^{10}+N_{ID}^{cell}$ (or $c_{init\_2}=n_{ssblock}\cdot 2^{10}+N_{ID}^{cell}$)

Configuration Example of Embodiment C-1:

$$c_{init\_1}=N_{ID}^{cell}(\text{or } c_{init\_1}=N_{ID}^{cell}\cdot 2^{10}+N_{ID}^{cell})$$

$$c_{init\_2}=n_{ssblock}(\text{or } c_{init\_2}=n_{ssblock}\cdot 2^3+n_{ssblock} \text{ or}$$
$$c_{init\_2}=n_{ssblock}\cdot 2^{12}+n_{ssblock}\cdot 2^9+n_{ssblock}\cdot$$
$$2^6+n_{ssblock}\cdot 2^3+n_{ssblock})$$

Configuration Example of Embodiment C-2:

$$c_{init\_1}=n_{ssblock}(\text{or } c_{init\_1}=n_{ssblock}\cdot 2^3+n_{ssblock})$$

$$c_{init\_2}=N_{ID}^{cell}$$

The PN sequence needs to be initialized using one of the $C_{init\_1}$ values and one of the $C_{init\_2}$ values at start of each SS block within an SS burst set.

If information about an SS block transmission interval (5 ms) needs to be additionally transferred through the PBCH DMRS sequence, $N^{SSblock}_{5ms}$ may be added to $c_{init\_1}$ and $C_{init\_2}$ and used as an initial value for generating the PN sequence.

Examples of available combinations for $C_{init\_1}$ (order N) are shown in the following Table 5.

TABLE 5

$c_{init\_1} = (n_{ssblock} + 1) \cdot (2N_{ID}^{cell} + 1) \cdot 2^{11} + 2 \cdot N_{ID}^{cell} + N_{5\,ms}^{SSblock}$: $N_{ID}^{cell}$ is used twice, $n_{ssblock}$ is used once, $N_{5\,ms}^{SSblock}$ is used once in an example, or $c_{init\_1} = n_{ssblock} \cdot 2^{11} + 2 \cdot N_{ID}^{cell} + N_{5\,ms}^{SSblock}$: $N_{ID}^{cell}$ is used once, $n_{ssblock}$ is used once, $N_{5\,ms}^{SSblock}$ is used once in an example, or $c_{init\_1} = (N_{ID}^{cell} + 1) \cdot (2n_{ssblock} + 1) \cdot 2^4 + 2 \cdot n_{ssblock} + N_{5\,ms}^{SSblock}$: $N_{ID}^{cell}$ is used once, $n_{ssblock}$ is used twice, $N_{5\,ms}^{SSblock}$ is used once in an example, or $c_{init\_1} = N_{ID}^{cell} \cdot 2^4 + 2 \cdot n_{ssblock} + N_{5\,ms}^{SSblock}$: $N_{ID}^{cell}$ is used once, $n_{ssblock}$ is used once, $N_{5\,ms}^{SSblock}$ is used once in an example, or $c_{init\_1} = N_{ID}^{cell}$ or $c_{init\_1} = N_{ID}^{cell} \cdot 2^{10} + N_{ID}^{cell}$: $N_{ID}^{cell}$ is used once or twice in an example, or $c_{init\_1} = n_{ssblock}$ or $c_{init\_1} = n_{ssblock} \cdot 2^3 + n_{ssblock}$: $n_{ssblock}$ is used once or twice in an example.

Examples of available combinations for $C_{init\_2}$ (order N/2) are shown in the following Table 6.

TABLE 6

$c_{init\_2} = n_{ssblock} \cdot 2^{10} + N_{ID}^{cell}$: $N_{ID}^{cell}$ is used once, $n_{ssblock}$ is used once in an example, or $c_{init\_2} = N_{ID}^{cell} \cdot 2^3 + n_{ssblock}$: $N_{ID}^{cell}$ is used once, $n_{ssblock}$ is used in an example, or $c_{init\_2} = (N_{ID}^{cell} + 1) \cdot (2n_{ssblock} + 1) \cdot 2^3 + n_{ssblock}$: $N_{ID}^{cell}$ is used once, $n_{ssblock}$ is used twice in an example, or $c_{init\_2} = N_{ID}^{cell}$: $N_{ID}^{cell}$ is used once in an example, or $c_{init\_2} = n_{ssblock}$ or $c_{init\_2} = n_{ssblock} \cdot 2^3 + n_{ssblock}$: $n_{ssblock}$ is used once or twice in an example.

Other system parameters are the same as those described above.

$N^{SSblock}_{5ms}$: has information range of 0~1 about SS block transmission interval (5 ms) timing.

2. Initialization of PBCH DMRS Sequence per SS Block and OFDM Symbol

Initial values $C_{init\_1}$ and $C_{init\_2}$ for PN sequence generation may be defined based on combinations of $N^{cell}_{ID}$, $n_{ssblock}$, and l'. The following Table 7 shows a portion of the combinations. Thus, the combinations are not limited to the following embodiments and it is assumed that each of $N^{cell}_{ID}$, $n_{ssblock}$, and l' may initialize the PN sequence using one of all combinations in $C_{init\_1}$ and $C_{init\_2}$.

The following Table 7 shows an example of the method of configuring $C_{init\_1}$ and $C_{init\_2}$ for Kasami sequence generation.

TABLE 7

| PN sequence generation | System parameters for configuring Cinit_1 (order N) for 2$^{nd}$ Polynomial | System parameters for configuring Cinit_2 (order N/2) for 3$^{rd}$ Polynomial |
|---|---|---|
| Example#1-1 | 1) $N_{ID}^{cell}$, 2) $n_{ssblock}$, 3) l' | 1) $N_{ID}^{cell}$, 2) $n_{ssblock}$ |
| Example#1-2 | 1) $N_{ID}^{cell}$, 2) $n_{ssblock}$, 3) l' | (A fixed value not derived by a system parameter) |
| Example#2-1 | 1) $N_{ID}^{cell}$, 2) $n_{ssblock}$ | 1) $n_{ssblock}$, 2) l' |
| Example#2-2 | 1) $N_{ID}^{cell}$ | 1) $n_{ssblock}$, 2) l' |
| Example#3-1 | 1) $n_{ssblock}$, 2) l' | 1) $N_{ID}^{cell}$ |
| Example#3-2 | 1) $n_{ssblock}$, 2) l' | 1) $N_{ID}^{cell}$, 2) $n_{ssblock}$ |
| Example#4-1 | 1) $N_{ID}^{cell}$, 2) l' | 1) $n_{ssblock}$ |
| Example#4-2 | 1) $n_{ssblock}$ | 1) $N_{ID}^{cell}$, 2) l' |

Hereinafter, examples in which l (1 bit), $n_{ssblock}$ (3 bits), and $N^{cell}_{ID}$ (10 bits) are assumed is described.

Configuration Example of Embodiment A-1:

$$c_{init\_1}=(2*(n_{ssblock}+1)+l'+1)\cdot(2N_{ID}^{cell}+1)\cdot 2^{10}+N_{ID}^{cell}$$

$$c_{init\_2}=(n_{ssblock}+1)\cdot(2N_{ID}^{cell}+1)\cdot 2^{10}+N_{ID}^{cell}(\text{or } c_{init\_2}=n_{ssblock}+N_{ID}^{cell})$$

Configuration Example of Embodiment A-2:

$$c_{init\_1}=(2*(n_{ssblock}+1)+l'+1)\cdot(2N_{ID}^{cell}+1)\cdot 2^{10}+N_{ID}^{cell}$$

$$c_{init\_2}=\Sigma_{i=0}^{14}x_3(i)\cdot 2^i, x_3(0)=1, x_3(n)=0, n=1,2,\ldots 14$$

Configuration Example of Embodiment B-1:

$$c_{init\_1}=(n_{ssblock}+1)\cdot(2N_{ID}^{cell}+1)\cdot 2^{10}+N_{ID}^{cell} \text{ (or}$$
$$c_{init\_1}=n_{ssblock}\cdot 2^{10}+N_{ID}^{cell} \text{ or } c_{init\_1}=(N_{ID}^{cell}+1)\cdot$$
$$(2n_{ssblock}+1)\cdot 2^3+n_{ssblock} \text{ or } c_{init\_1}=N_{ID}^{cell}\cdot 2^3+$$
$$n_{ssblock})$$

$$c_{init\_2}=l'\cdot 2^3+n_{ssblock} \text{ (or } c_{init\_2}=n_{ssblock}\cdot 2+l')$$

Configuration Example of Embodiment B-2:

$$c_{init\_1}=N_{ID}^{cell}(\text{or } c_{init\_1}=N_{ID}^{cell}\cdot 2^{10}+N_{ID}^{cell})$$

$$c_{init\_2}=l'\cdot 2^2+n_{ssblock} \text{ (or } c_{init\_2}=n_{ssblock}\cdot 2+l')$$

Configuration example of Embodiment C-1:

$$c_{init\_1}=l'\cdot 2^3+n_{ssblock} \text{ (or } c_{init\_1}=n_{ssblock}\cdot 2+l')$$

$$c_{init\_2}=N_{ID}^{cell}$$

Configuration example of Embodiment C-2:

$$c_{init\_1}=l'\cdot 2^3+n_{ssblock} \text{ (or } c_{init\_1}=n_{ssblock}\cdot 2+l')$$

$$c_{init\_2}=(n_{ssblock}+1)\cdot(2N_{ID}^{cell}+1)\cdot 2^{10}+N_{ID}^{cell} \text{ (or } c_{init\_2}=n_{ssblock}\cdot 2^{10}+N_{id}^{cell})$$

Configuration Example of Embodiment D-1:

$$c_{init\_1}=l'\cdot 2^{10}+N_{ID}^{cell} \text{ (or } c_{init\_1}=N_{ID}^{cell}\cdot 2+l')$$

$$c_{init\_2}=n_{ssblock}(\text{or } c_{init\_2}=n_{ssblock}\cdot 2^3+n_{ssblock} \text{or}$$
$$c_{init\_2}=n_{ssblock}\cdot 2^{12}+n_{ssblock}\cdot 2^9+n_{ssblock}\cdot 2^6+n_{ssblock}\cdot 2^3+n_{ssblock})$$

Configuration example of Embodiment D-2:

$$c_{init\_1}=n_{ssblock}(\text{or } c_{init\_1}=n_{ssblock}\cdot 2^3+n_{ssblock})$$

$$c_{init\_2}=l'\cdot 2^{10}+N_{ID}^{cell} \text{ (or } c_{init\_2}=N_{ID}^{cell}\cdot 2+l')$$

The PN sequence needs to be initialized using $C_{init\_1}$ and $C_{init\_2}$ values at start of each OFDM symbol within each SS block of an SS burst set.

If information about an SS block transmission interval (5 ms) needs to be additionally transferred through the PBCH DMRS sequence, $N^{SSblock}_{5ms}$ may be added to to $C_{init\_1}$ or $C_{init\_2}$ as shown in the following Equation 25 and used as an initial value for generating the PN sequence.

$$c_{init\_1}=(2^*(n_{ssblock}+1)+l'+1)\cdot(2N_{ID}^{cell}+1)\cdot 2^{11}+2\cdot N_{ID}^{cell}+N_{5ms}^{SSblock} \text{ or } c_{init\_2}=(2^*(n_{ssblock}+1)+l'+1)\cdot 2^4+n_{ssblock}\cdot 2+N_{5ms}^{SSblock}$$ [Equation 25]

Other parameters are the same as those described above.

l': has the OFDM symbol index of 0~1 or range of 0~13 for PBCH DMRS transmission within the SS block.

The DMRS sequence is generated using one of the two initial values for PN sequence generation and the QPSK modulation scheme as expressed by Equation 1. Also, the BPSK modulation scheme may be used.

Referring to FIG. 15, in all of PRBs within a PBCH transmission bandwidth, three DMRS REs are used to allocate the proposed PBCH DMRS sequence per OFDM symbol. Shift is performed on a frequency axis with a scheme of, for example, V_dmrs_shift=ID mod 4 based on a different cell ID, virtual ID, or UE ID according to the aforementioned equations.

Figure 16:
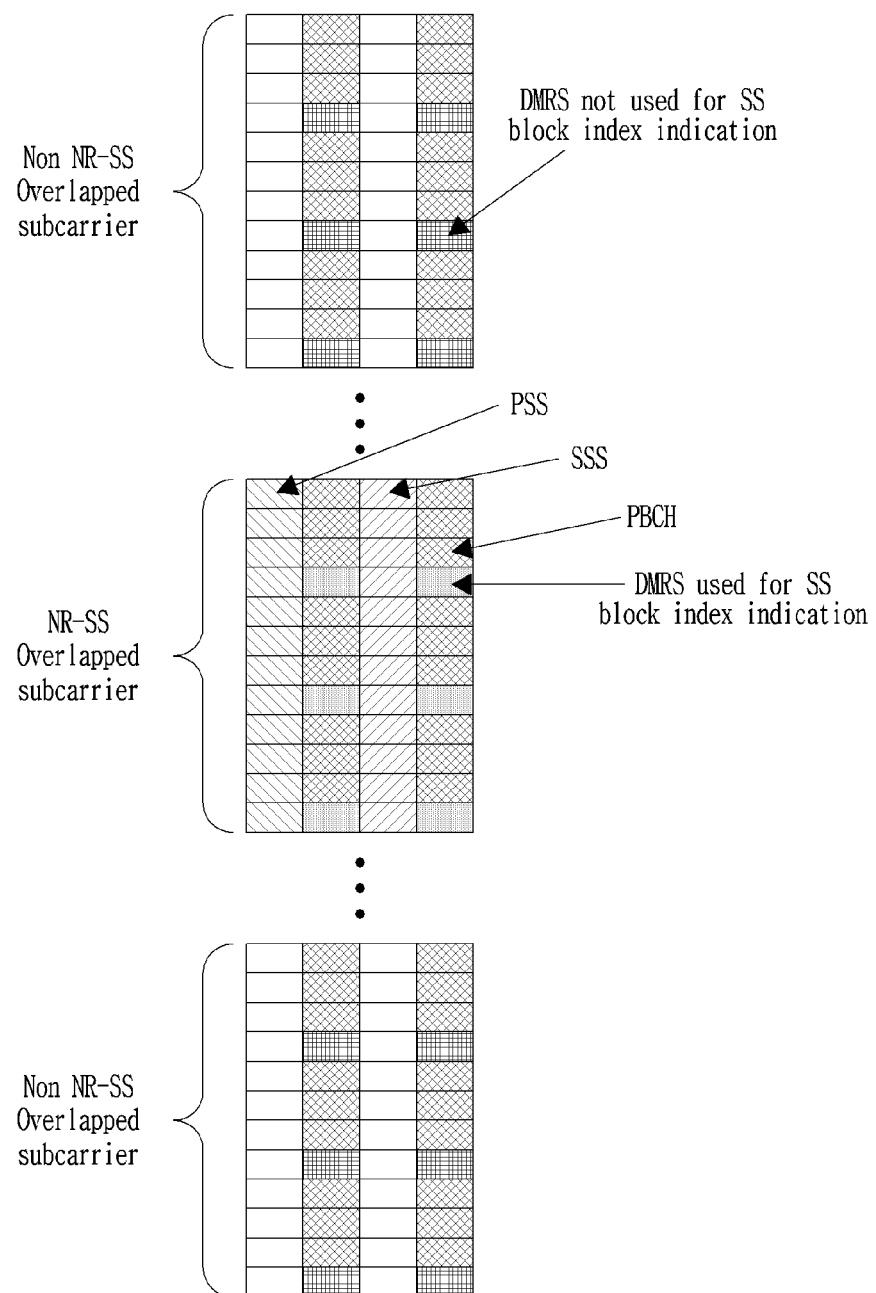

Referring to FIG. 16, a PBCH reference signal is transmitted to indicate a proposed SS block index only within a transmission bandwidth in which an NR-SS is transmitted. In other PBCH bandwidth, a reference signal generated based on a cell ID alone is transmitted. Shift is performed on a frequency axis with a scheme, for example, V_dmrs_shift=ID mod 4, based on a different cell ID, virtual ID, or UE ID according to the aforementioned equations.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method comprising:
   determining, based on a synchronization signal (SS) block index and based on an index associated with a time interval, an initialization value for a reference signal associated with a physical broadcast channel (PBCH);
   generating, based on the initialization value, the reference signal associated with a PBCH;
   mapping, based on one or more of a frequency domain shift value or a time domain shift value, the generated reference signal to resource elements (REs); and
   transmitting, to a terminal, the mapped reference signal and the PBCH.

2. The method of claim 1, wherein the initialization value is determined based on a cell identifier, the SS block index, and the index associated with the time interval.

3. The method of claim 2, wherein the cell identifier is associated with a base station that communicates with the terminal.

4. The method of claim 1, wherein the time interval is a frame or one or more slots.

5. The method of claim 1, wherein the SS block index corresponds to an index of an SS block, the SS block comprising a PBCH, a primary synchronization signal, and a secondary synchronization signal.

6. The method of claim 1, wherein the REs are included in an SS block corresponding to the SS block index.

7. The method of claim 6, wherein the SS block corresponding to the SS block index comprises at least four orthogonal frequency division multiplexing (OFDM) symbols,
   wherein a first OFDM symbol of the at least four OFDM symbols comprises a primary synchronization signal, a second OFDM symbol of the at least four OFDM symbols comprises a portion of the PBCH, and a third OFDM symbol of the at least four OFDM symbols comprises a secondary synchronization signal, and wherein the second OFDM symbol is located between the first OFDM symbol and the third OFDM symbol.

8. The method of claim 7, wherein the third OFDM symbol is located between the second OFDM symbol and a fourth OFDM symbol of the at least four OFDM symbols, wherein another portion of the PBCH is mapped in the third OFDM symbol and the fourth OFDM symbol, and wherein a demodulation reference signal (DM-RS) associated with the PBCH is mapped in the second, third and fourth OFDM symbols.

9. The method of claim 1, further comprising, for each SS block, initializing a scrambling sequence and generating, based on the initialized scrambling sequence, a reference signal associated with a PBCH.

10. The method of claim 1, wherein the reference signal associated with the PBCH is a PBCH demodulation reference signal (DM-RS).

11. An apparatus comprising:
an antenna;
a processor configured to determine, based on a synchronization signal (SS) block index and based on an index associated with a time interval, an initialization value for a reference signal associated with a physical broadcast channel (PBCH), to generate, based on the initialization value, the reference signal associated with a PBCH, and to map, based on one or more of a frequency domain shift value or a time domain shift value, the generated reference signal to one or more resource elements (REs); and
a transmitter to transmit, to a terminal and via the antenna, the mapped reference signal and the PBCH.

12. The apparatus of claim 11, wherein the initialization value is determined based on a cell identifier, the SS block index, and the index associated with the time interval.

13. The apparatus of claim 12, wherein the cell identifier is associated with a base station that communicates with the terminal.

14. The apparatus of claim 11, wherein the time interval is a frame or one or more slots.

15. The apparatus of claim 11, wherein the SS block index corresponds to an index of an SS block, the SS block comprising a PBCH, a primary synchronization signal, and a secondary synchronization signal.

16. The apparatus of claim 11, wherein the REs are included in an SS block corresponding to the SS block index.

17. The apparatus of claim 16, wherein the SS block corresponding to the SS block index comprises at least four orthogonal frequency division multiplexing (OFDM) symbols,
wherein a first OFDM symbol of the at least four OFDM symbols comprises a primary synchronization signal, a second OFDM symbol of the at least four OFDM symbols comprises a portion of the PBCH, and a third OFDM symbol of the at least four OFDM symbols comprises a secondary synchronization signal, and
wherein the second OFDM symbol is located between the first OFDM symbol and the third OFDM symbol.

18. The apparatus of claim 17, wherein the third OFDM symbol is located between the second OFDM symbol and a fourth OFDM symbol of the at least four OFDM symbols, wherein another portion of the PBCH is mapped in the third OFDM symbol and the fourth OFDM symbol, and wherein a demodulation reference signal (DM-RS) associated with the PBCH is mapped in the second, third and fourth OFDM symbols.

19. The apparatus of claim 11, wherein the processor is configured to initialize, for each SS block, a scrambling sequence and generate, based on the initialized scrambling sequence, a reference signal associated with a PBCH.

20. The apparatus of claim 11, wherein the reference signal associated with the PBCH is a PBCH demodulation reference signal (DM-RS).

* * * * *